United States Patent [19]

Yoshida et al.

[11] Patent Number: 4,761,692
[45] Date of Patent: Aug. 2, 1988

[54] METHOD AND APPARATUS FOR DATA RECORDING DISC PLAYBACK

[75] Inventors: Masayuki Yoshida; Izumi Ueda; Hidehiro Ishii; Takahumi Shiba; Fumihiro Nakajima, all of Tokorozawa, Japan

[73] Assignee: Pioneer Electronic Corporation, Tokyo, Japan

[21] Appl. No.: 38,358

[22] Filed: Apr. 14, 1987

[30] Foreign Application Priority Data

| Apr. 15, 1986 | [JP] | Japan | 61-86711 |
| Apr. 15, 1986 | [JP] | Japan | 61-86712 |
| Apr. 15, 1986 | [JP] | Japan | 61-86713 |
| Apr. 15, 1986 | [JP] | Japan | 61-86714 |
| Apr. 15, 1986 | [JP] | Japan | 61-86715 |
| Apr. 15, 1986 | [JP] | Japan | 61-86716 |
| Apr. 15, 1986 | [JP] | Japan | 61-86719 |
| Apr. 15, 1986 | [JP] | Japan | 61-86722 |

[51] Int. Cl.$^4$ .............................. H04N 5/76
[52] U.S. Cl. .................. 358/335; 358/342; 358/907; 360/77; 369/50; 369/59; 369/47; 369/44
[58] Field of Search .............. 358/335, 310, 342, 907; 360/77; 369/43–47, 50, 59

[56] References Cited

U.S. PATENT DOCUMENTS 4,641,204  2/1987  Sugiyama ....................... 358/342 X Primary Examiner—L. T. Hix
Assistant Examiner—D. Rutledge
Attorney, Agent, or Firm—Fleit, Jacobson, Cohn & Price

[57] ABSTRACT

A method and apparatus for playback of a data recording disc which contains a CD area in which a signal such as an audio signal is recorded in digital form and a video area in which a FM-modulated video signal is recorded with a digital audio signal superimposed thereon. The position of a data detection point of a pickup is monitored, and the equalization and amplifier gain of components of a digital demodulation system are automatically changed in accordance with playback being executed of the CD area or the video area, so that a single demodulation system is used for both digital signals from the CD area and digital signals from the video area. In addition, the frequency characteristics of components in servo systems which control the spindle motor, pickup carriage, etc. of the apparatus are automatically changed over for CD area and video area playback respectively, to provide stable servo control in spite of the high speed of rotation during video data playback.

14 Claims, 18 Drawing Sheets

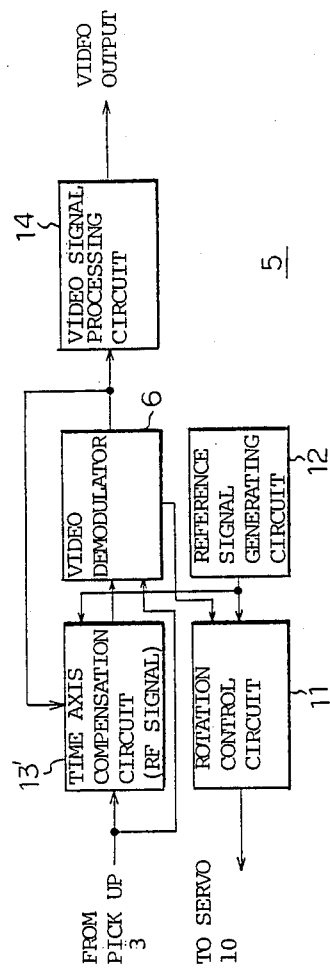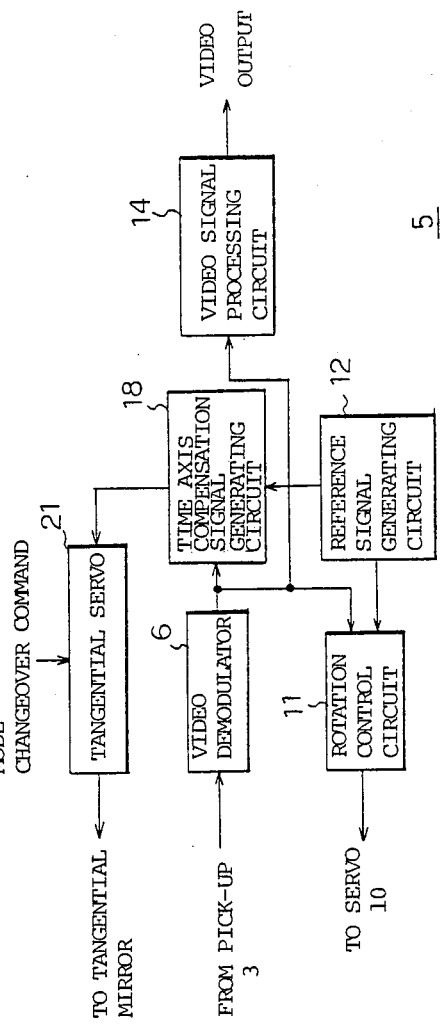

F I G. 7
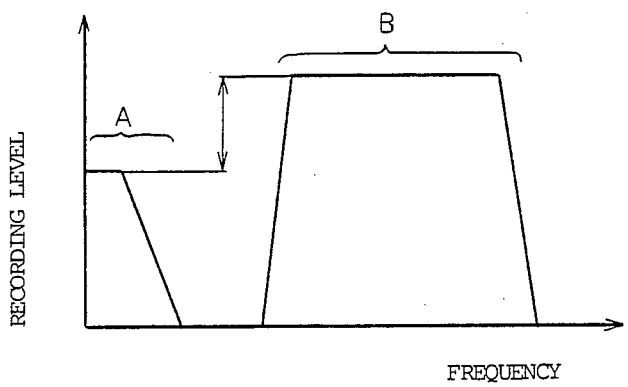
F I G. 8
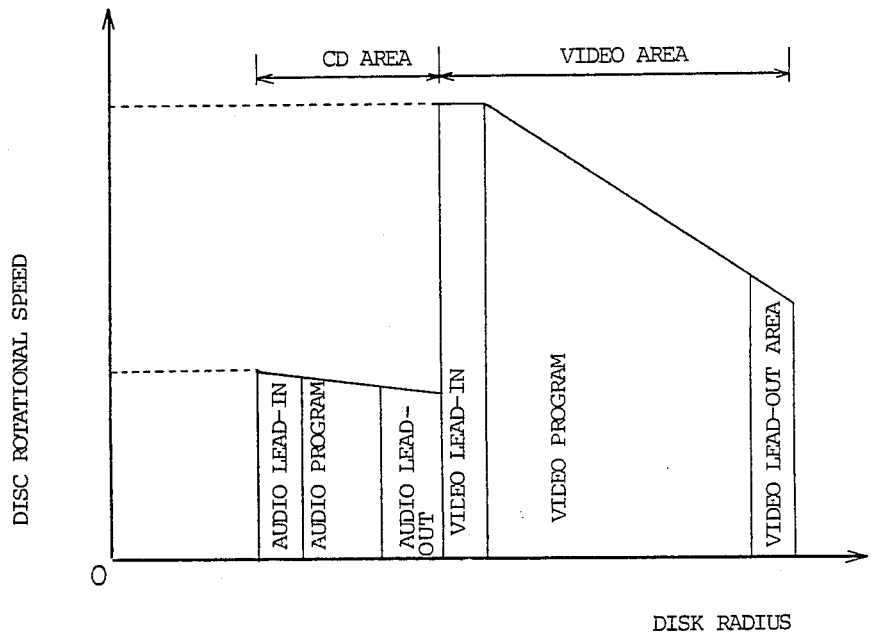

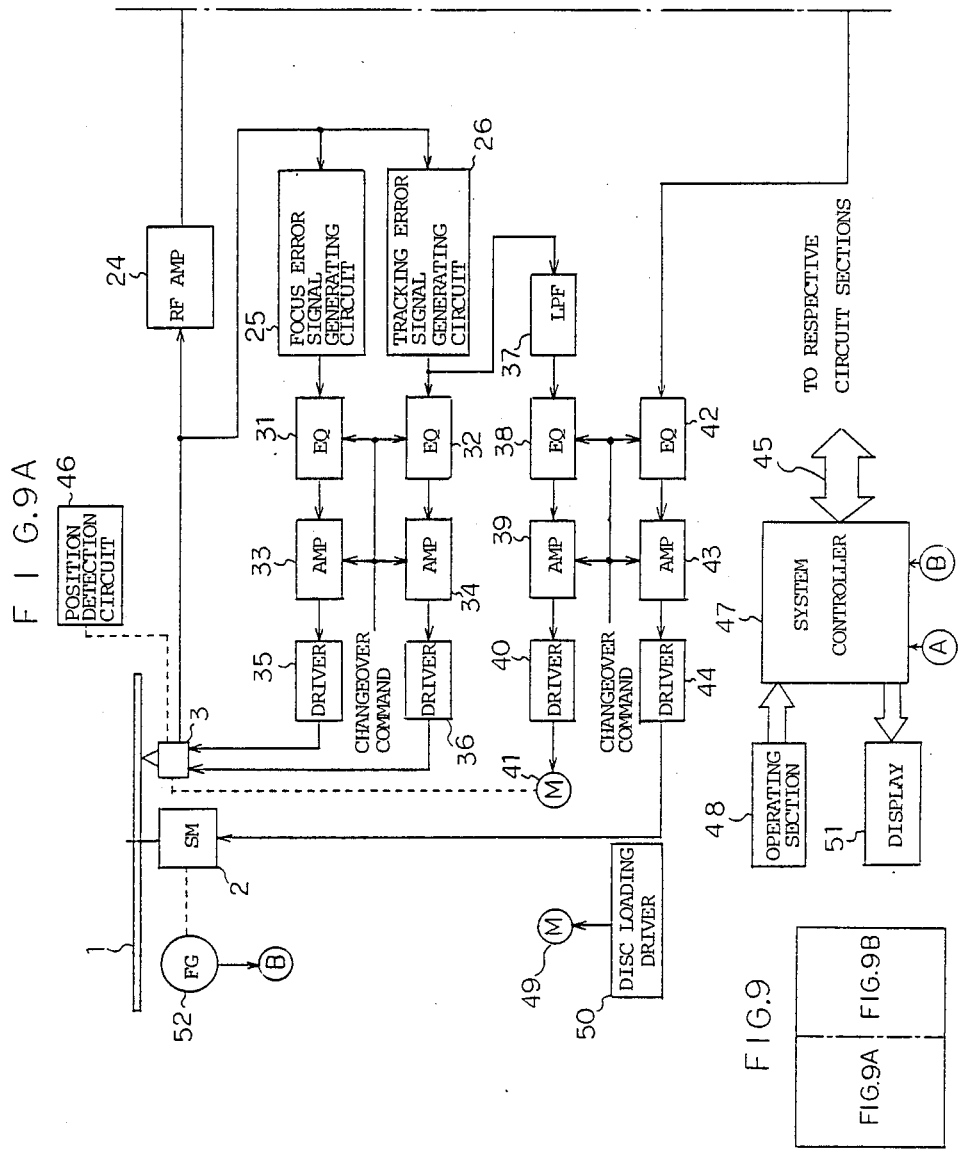

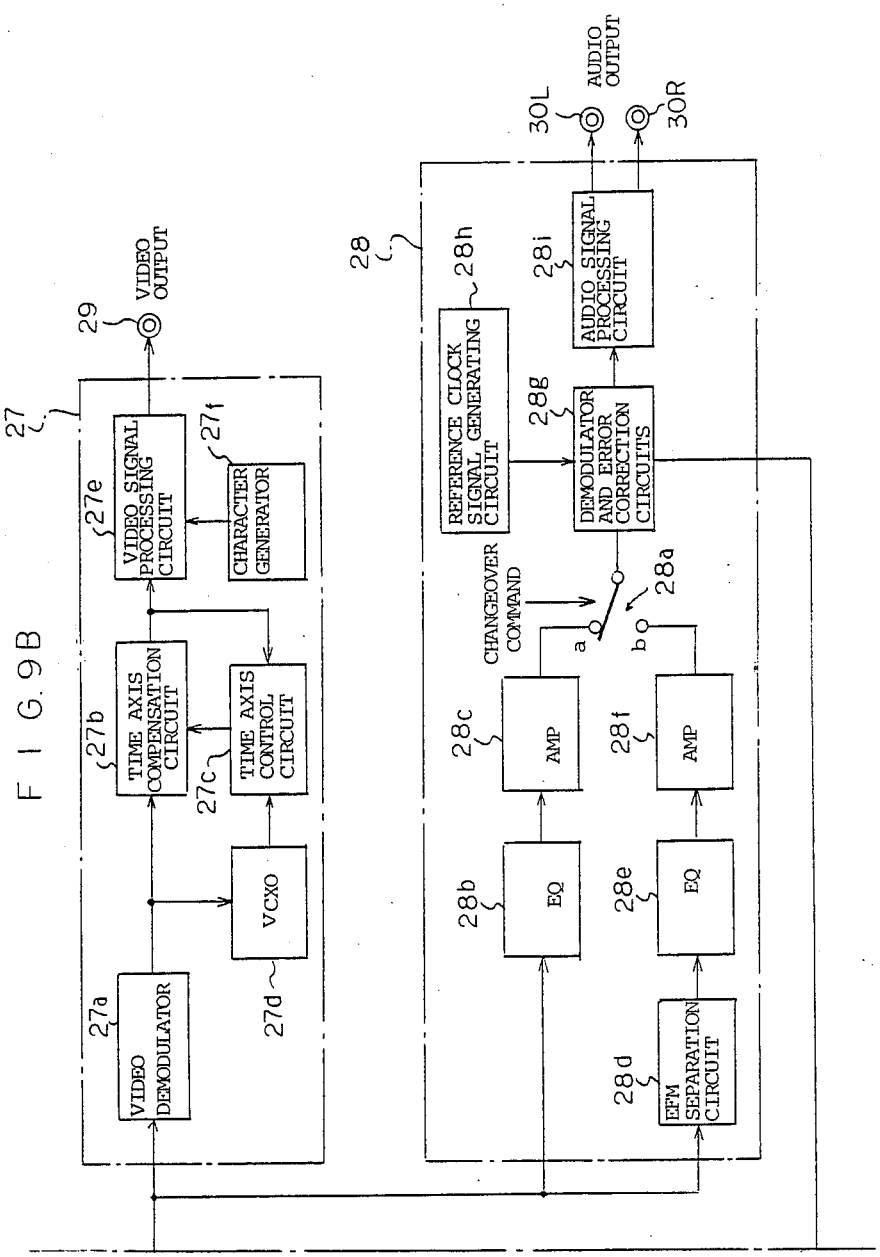

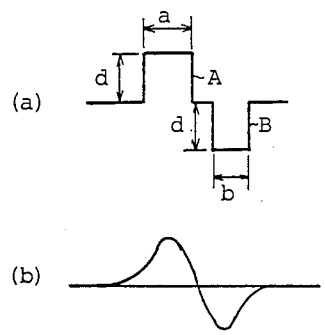
F I G. 10
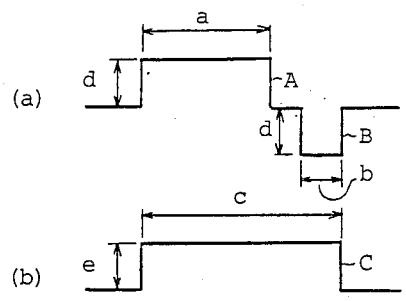
F I G. 11
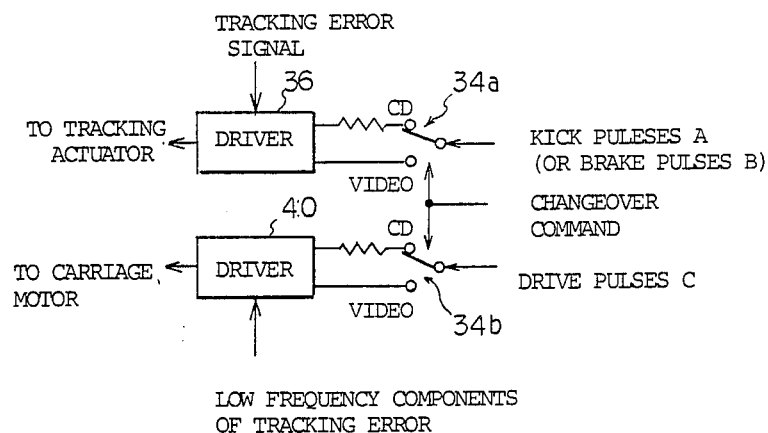
F I G. 12

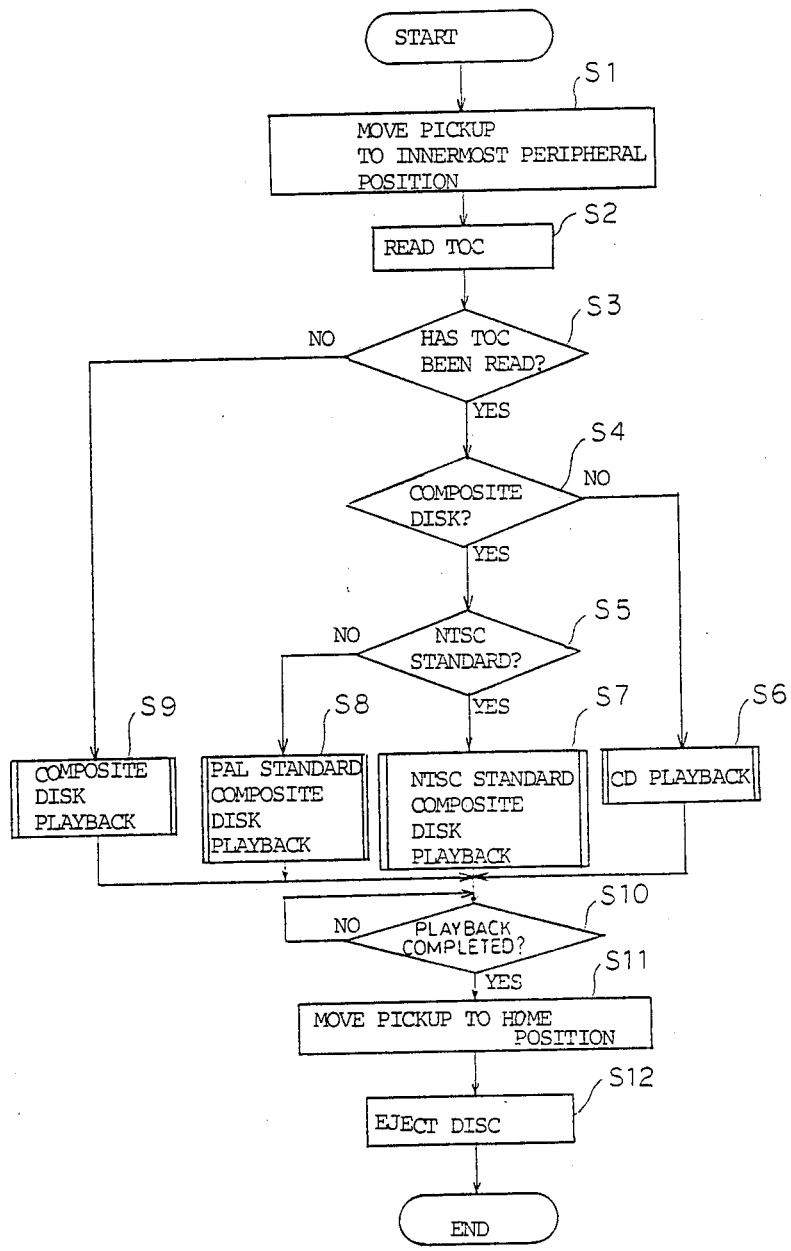
F I G. 14

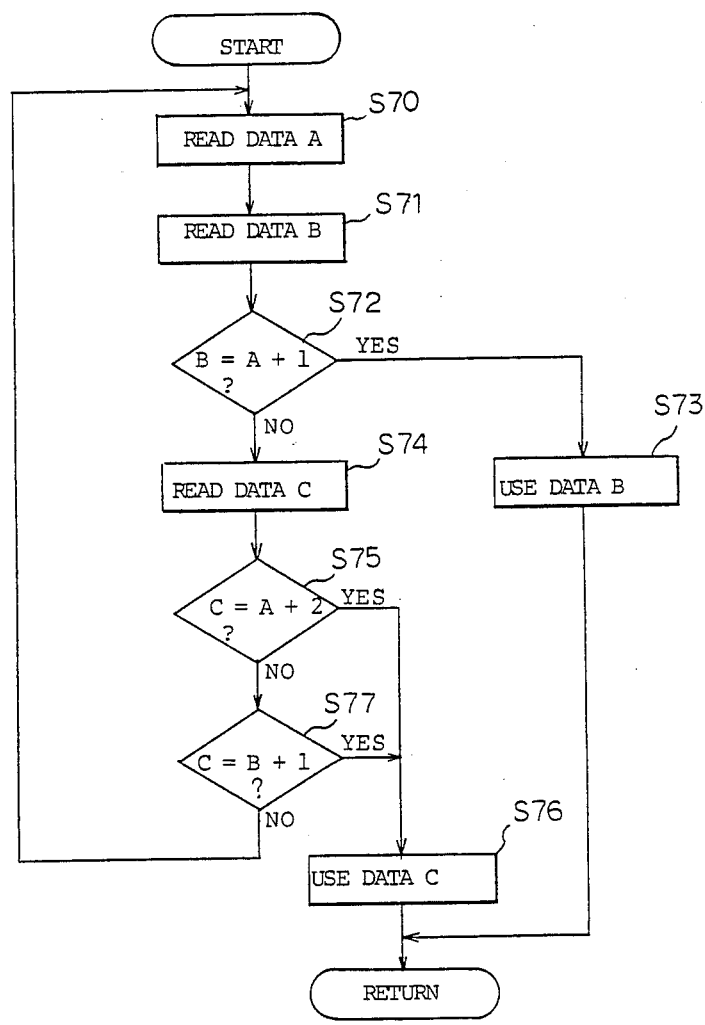
F I G.18

F I G. 19
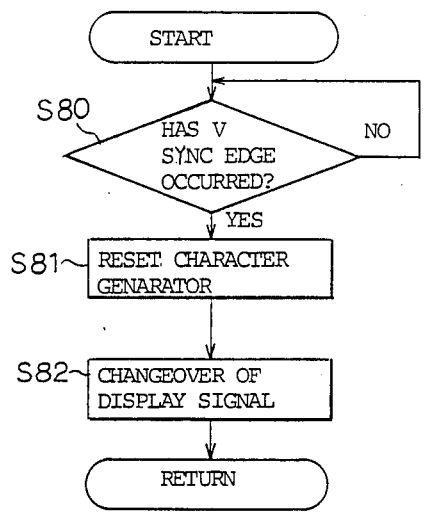
F I G. 20
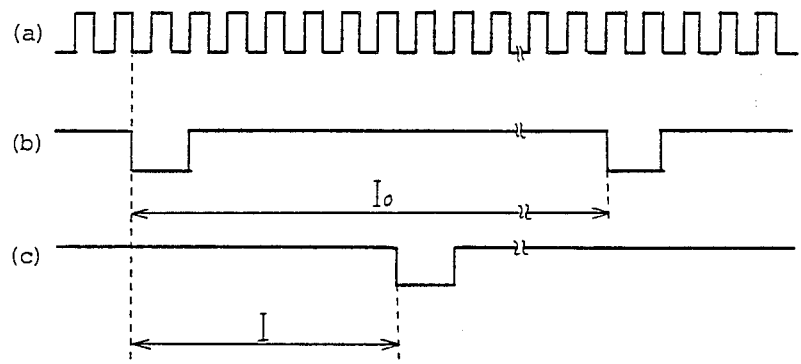

F I G. 22
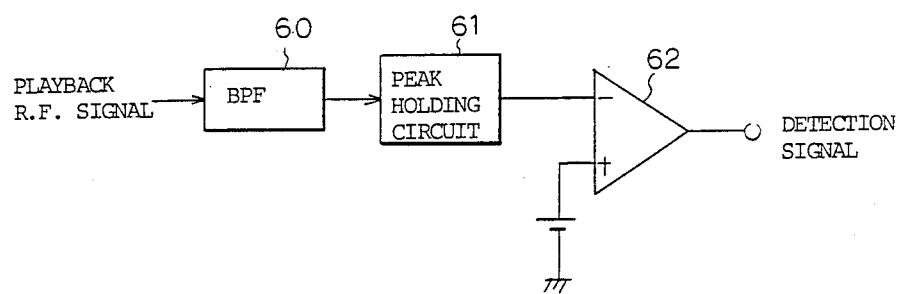
F I G. 23
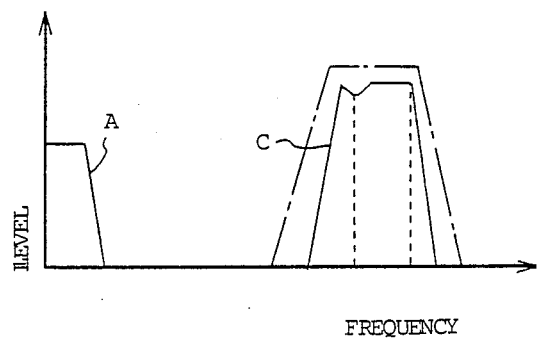

METHOD AND APPARATUS FOR DATA RECORDING DISC PLAYBACK

BACKGROUND OF THE INVENTION

1. Field of the Invention

The present invention relates to a method and apparatus for playback of data recording disks, and in particular to a method and apparatus for playback of data recording disks (referred to hereinafter simply as disks) having digital signals recorded thereon.

2. Description of Background Information

Small-diameter audio disks having a diameter of approximately 12 cm and having digital signals recorded thereon, generally called "compact disks" or CDs, are now well known. However in recent years another type of disk, referred to in the following as a composite disk, has been developed, having an area in which is recorded an FM modulated video signal with a PCM signal superimposed thereon, as well as an area having only a PCM signal recorded. With such a composite disk, the area having only PCM data recorded, e.g. audio data in PCM form, may for example be disposed in an inner peripheral area of the disc, (this area being referred to hereinafter as the CD area), while the area containing the FM video signal with superimposed PCM signal (this area being referred to hereinafter as the video area) may be disposed peripherally outward from the CD area, separated therefrom by a predetermined radial distance.

A video signal contains higher frequency components than those of the PCM signal of the video area, so that the spectrum of the signals recorded in the video area will be as shown in FIG. 7, in which A denotes the PCM signal frequency components, and B denotes the video FM signal frequency components. At the time of recording the video area signals, the speed of rotation of the disc must be made higher than during that used during recording of the CD area, and therefore of course during playback it is necessary to rotate the disc at a higher speed during video area playback than during CD area playback. As shown in FIG. 8, the speed of disc rotation during CD area playback is several hundred r.p.m., whereas during video area playback the speed of rotation is two thousand plus several hundred r.p.m. for playback from the innermost periphery of that area, and is one thousand plus several hundred r.p.m. for playback from the outermost periphery of that area, so that the speed of rotation is extremely high during video area playback.

Thus, if it were attempted to use a prior art type of CD disc playback apparatus for reading recorded data from the video area of a composite disc, the frequency of the error signal supplied to the servo system which controls the position of the data detection point of the pickup with respect to the disc would be substantially higher than during CD data read-out. Since the servo loop gain is lowered when a high-frequency error signal is applied, there would be a loss of positioning control for the data detection point during such video area playback operation, so that it would be difficult to achieve satisfactory reading of video data from the disc.

In order to perform playback of a composite disc therefore, since the speed of rotation of the disc is extremely different between CD area and video area playback, it is necessary to change the disc rotation speed each time the playback area is changed. Furthermore in order to minimize costs, it is desirable to use a common demodulation system for the playback digital signals produced from both the video area and the CD area, and therefore the signal processing system for the playback digital signals must be capable of meeting this requirement. In addition, if such a playback apparatus is to be made capable of playback of both CD discs and composite discs, then various other requirements will be imposed on the apparatus.

Since with composite disc playback, as stated above, the disc speed of rotation is extremely different for CD area playback and video area playback respectively, it is necessary for the various servo systems of the apparatus to display different frequency characteristics for video area playback and CD area playback respectively, due to the higher frequency of the error signals which are supplied to the servo systems during video area playback. Furthermore, also as a result of the higher speed of rotation during video area playback, the overall servo loop gain will be low, due to the effects of various component elements in each loop such as actuators etc., which behave as intergrator elements. Measures to compensate for this loss of gain must also be provided.

Moreover, also due to the high speed of rotation during video area playback as compared with CD area playback with a composite disc, problems will arise with respect to track jumping. Specifically, the high speed of rotation during video area playback will magnify the adverse effects of any disc deviations such as eccentricity, and this must be taken into consideration if accurately determined amounts of track jumping are to be executed within the video area and the CD area.

Furthermore, various color television standards are used at present for the video data recorded in the video area, i.e. the NTSC and the PAL standards. If the television standard of the disc does not conform to that of the playback apparatus, then synchronization for video playback will not be possible, so that video data playback cannot be executed. However, in the case of a composite disc, video data are only recorded in one area of the disc, whereas audio data are recorded throughout the entire disc. Thus, it is undesirable that is should be completely impossible to perform playback of any data whatsoever from a composite disc, simply because the television standard of the video data is different from that of the playback apparatus.

Also, since the data recorded in the video area and CD area are respectively different, as are the playback speeds of rotation for each area, it is necessary to apply appropriate speed control for playback of each area, while in addition it is necessary that both video data and audio data playback can be performed simultaneously in the video area.

SUMMARY OF THE INVENTION

It is an objective of the present invention to provide a method and apparatus whereby recorded data can be read in a satisfactory manner from a digital audio disc having an area in which video signals are recorded.

It is further objective of the present invention to provide a data recording disc playback apparatus whereby during playback of a composite disc, a single demodulation system can be used in common for playback digital signals obtained from both the CD area and the video area of the disc.

It is a further objective of the present invention to provide a data recording disc playback apparatus whereby during playback of a composite disc, stable servo control is attained during playback of both the video area and the CD area, and whereby the recorded data can be read in a reliable manner from each of these areas.

It is a further objective of the present invention to provide a data recording disc playback apparatus whereby during playback of a composite disc, satisfactory track jumping operation can be achieved, during playback of both the video area and CD area.

It is a further objective of the present invention to provide a data recording disc playback apparatus which is capable of playback of at least digital recorded data from a composite disc having a color television standard which does not conform to that of the playback apparatus.

It is a further objective of the present invention to provide a data recording disc playback apparatus whereby during playback of a composite disc, disc rotation speed control is applied during playback of both the CD area and video area, and whereby playback of video data and digital data from the video area can be performed simultaneously.

With a data recording disc playback apparatus according to the present invention, changeover of the gain of an amplifier used for error signal amplification in a servo system which controls the position of a data detection point of a pickup is executed in accordance with whether data is being read from an inner peripheral first area of the disc, in which specific data has been recorded by digital processing to be converted to a pulse train signal, and an outer peripheral second area of the disc, in which a signal consisting of a frequency modulated video signal with a specific digital signal superimposed thereon is recorded.

A data recording disc playback apparatus according to the present invention incorporates an equalizer circuit for performing compensation of the frequency characteristic of a playback digital signal, and means for changeover of the equalization characteristic of the equalizer circuit in accordance with playback from the CD area and video area of the disk respectively.

A data recording disc playback apparatus according to the present invention further incorporates an amplitude control circuit for controlling the amplitude of a playback digital signal, and means for changeover of a degree of control applied by the amplitude control circuit, in accordance with playback from the CD area and video area respectively of a composite disc.

A data recording disc playback apparatus according to the present invention further incorporates focus servo means, tracking servo means, carriage servo means, and spindle servo means, and means for changeover of the equalization characteristic of at least one equalizer circuit of these serve means, in accordance with playback of the CD area and video area respectively of a composite disc.

A data recording disc playback apparatus according to the present invention further comprises means for changeover of the gain of at least one servo amplifier of the aforementioned servo means, in accordance with playback of the CD area and video area respectively of a composite disc.

A data recording disc playback apparatus according to the present invention further comprises first means for biasing the data detection point of a pick-up along a disk radial direction, second means for displacing the pickup along the disc radial direction, and means for changeover of at least one of the pulse width and peak amplitude of drive pulses which are applied to the first means and the second means in response to a jump command.

A data recording disc playback apparatus is configured such that, when a composite disk having a color television standard which is different from that of the playback apparatus is set on the apparatus, spindle servo control is executed during playback of the video area of the disc in accordance with a phase difference between a playback clock signal contained in a playback digital signal and a reference clock signal, and output of the playback video signal is inhibited, with only a playback digital signal being produced as output.

Furthermore with a data recording disc playback apparatus according to the present invention, control of the speed of rotation of the disc is executed on the basis of an error signal which is derived on the basis of a phase difference between a playback clock signal contained in the playback video signal and a reference clock signal, irrespective of the disc area in which playback is being performed.

Moreover with a data recording disc playback apparatus according to the present invention, during playback of a composite disc, control of the disc speed of rotation is executed during playback of the CD area on the basis of an error signal which is derived from the phase difference between a playback clock signal contained in a playback digital signal and a reference clock signal, and is executed during playback of the video area on the basis of an error signal which is derived from the phase difference between a playback clock signal contained in a playback video signal and a reference clock signal.

It is a further objective of the present invention to provide a data playback method whereby during playback of a composite disc, playback operation can be accurately and reliably transferred to the video area of the disc.

It is a further objective of the present invention to provide a data playback method which is capable of playback of both CD discs and composite discs, and in particular whereby a substantial change in the disc speed of rotation can be accurately implemented during composite disc playback operation.

A data playback method according to the present invention is characterized in detection of a condition in which the data detection point of a pickup has reached a video area of a composite disc, and initiation of reading out recorded data by the pickup at the position thus detected to thereby derive specific data, and is further characterized in that when that data has been derived, the data detection point is displaced by a predetermined number of tracks towards the CD area of the disc, with playback of recorded data being then performed.

A data playback method according to the present invention applied to a playback apparatus capable of playback of both CD discs and composite discs is characterized in that disc identifier data which is recorded in a lead-in area is read at the time of disc playback, and in that if it is judged on the basis of the data thus read that the disc being played is a composite disc and that playback of the video area of that disc is designated, then the speed of rotation of the disc is accellerated towards a maximum rated speed of rotation, while the data detection point of the pickup is moved towards the video area of the disc.

BRIEF DESCRIPTION OF THE DRAWINGS

FIG. 3 is a partial block circuit diagram of a second embodiment of a data recording disc playback apparatus according to the present invention;

FIG. 4 is a partial block circuit diagram of third embodiment of a data recording disc playback apparatus according to the present invention;

FIG. 7 shows a frequency spectrum of signals recorded in a video area of a composite disc;

FIG. 8 is a diagram to illustrate the manner in which data recording areas of a composite disc are divided;

FIGS. 9A and 9B, when combined, are a block circuit diagram of a sixth embodiment of a data recording disc playback apparatus according to the present invention;

FIG. 9 is a diagram showing the juxtaposition of FIGS. 9A and 9B;

FIGS. 10 and 11 are waveform diagrams of drive pulses which are employed during track jump operations;

FIG. 12 is a circuit diagram of a circuit for changeover of peak amplitudes of the pulses of FIGS. 10 and 11;

FIG. 14 through FIG. 19 are flow charts of operating sequences which are executed by a microcomputer in the sixth embodiment of the invention, during playback of a disc;

FIGS. 20(a) through 20(c) are waveforms to show the phase relationships between a playback horizontal sync signal, a playback video vertical sync signal, and a blue picture vertical sync signal;

FIG. 22 is a block circuit diagram of an example of means for detecting a video area of a composite disc and;

FIG. 23 shows the passband of a bandpass filter used in the circuit of FIG. 22.

DETAILED DESCRIPTION OF THE INVENTION

Embodiments of the present invention will be described in the following, referring first to FIGS. 1 through 6.

Figure 1:
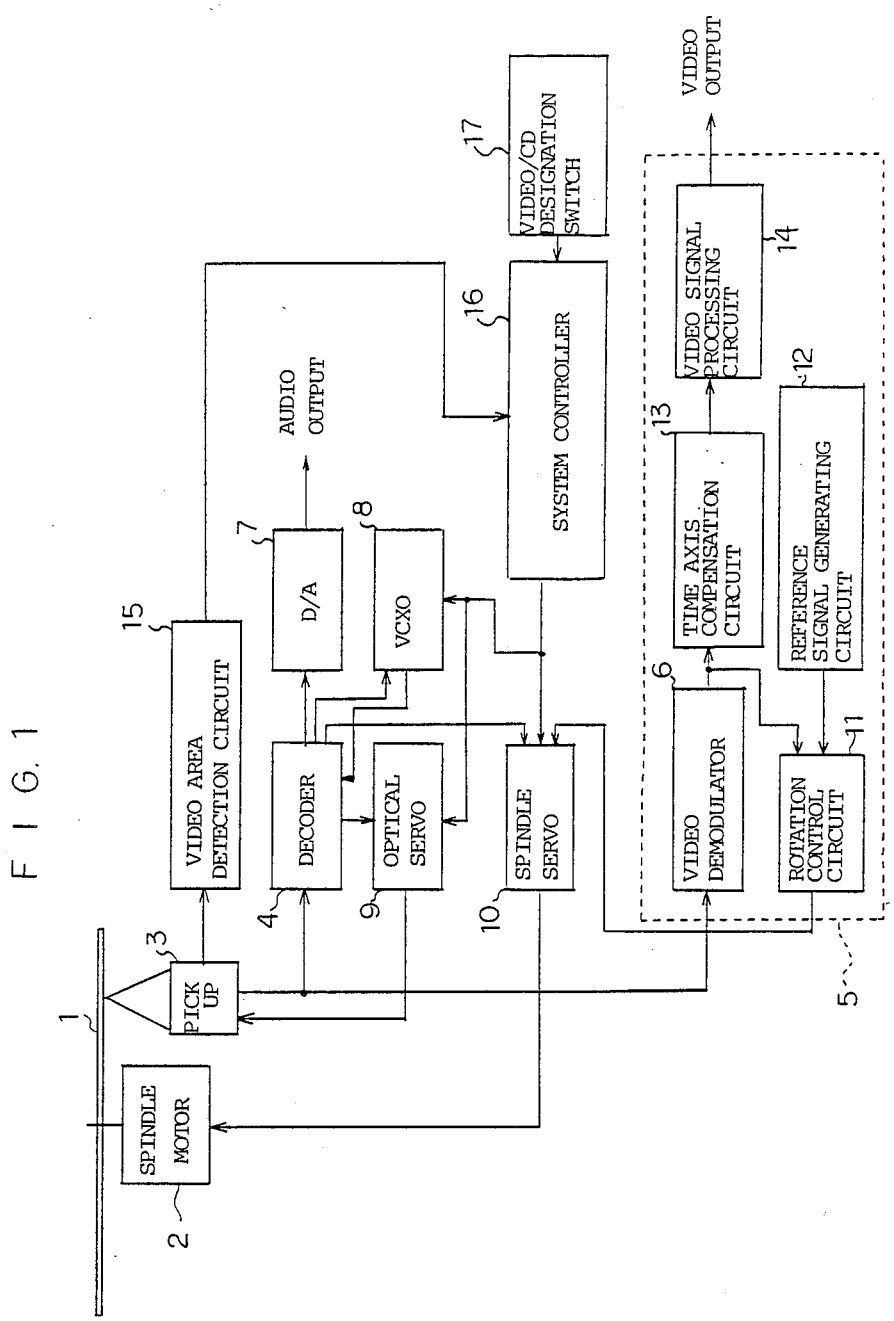
FIG. 1 is a block circuit diagram of a first embodiment of a data recording disc playback apparatus according to the present invention.

In FIG. 1, a disc 1 is rotated by a spindle motor 2, and data recorded on the disc 1 is read out by an optical type of pickup 3. The pickup 3 includes a built-in laser diode, object lens, focus actuator, tracking actuator, and photo-detector, etc. The output signals from the pickup 3 are supplied to a decoder 4, and to a video demodulator 6 within a video playback processing circuit 5.

The decoder 4 produces a focus error signal, for example by utilizing astigmatic aberration, and a tracking error signal, for example by utilizing the 3-beam method, and further performs regeneration of a clock signal for data demodulation purposes. The phase of this regenerated clock signal is compared with that of a clock signal which is produced from a clock signal generating circuit 8, and generation of a spindle error signal and data demodulation by an EFM (Eight to Fourteen Modulation) are respectively executed in accordance with the phase difference between these clock signals. The output data from the decoder 4 is converted to an audio signal by a D/A converter 7 (digital to analog converter). In addition, the regenerated clock signal produced from the decoder 4 is supplied to the clock signal generating circuit 8. The clock signal generating circuit 8 is configured to selectively output either a clock signal having a predetermined frequency, or a clock signal whose frequency is identical to that of the regenerated clock signal, with this selection being performed in response to a servo changeover command. The focus error signal and the tracking error signal produced from decoder 4 are supplied to an optical servo circuit 9.

The optical servo circuit 9 consists of a focus servo amplifier for driving the focus actuator within the pickup 3 in response to the focus error signal, a tracking servo amplifier for driving the tracking actuator in pickup 3 in response to the tracking error signal, and a carriage servo amplifier for driving a carriage motor to move the pickup 3 along a radial direction of disc 1 in response to the tracking error signal. The focus servo amplifier, tracking servo amplifier and carriage servo amplifier are respectively configured such that the gain of each amplifier can be increased in response to a servo changeover command. Furthermore the spindle error signal produced from decoder 4 is supplied to a spindle servo 10, which is also supplied with an output signal from a rotation control circuit 11. The spindle servo 10 is configured such as to drive the spindle motor 2 in response to one of the error signals produced from decoder 4 and rotation control circuit 11, as determined by a servo changeover command. A data detection point (i.e. spot) is formed on the recording surface of disc 1 by the operation of optical servo circuit 9 and spindle servo 10, which also control the relative position of the data detection point along a radial direction of disc 1, and the velocity of displacement of the data detection point with respect to disc 1. The rotation control circuit 11 is also configured such as to perform separation of the sync signal component of the video signal which is produced from video demodulator 6, and to produce as output an arror signal, in accordance with an amount of phase difference between this sync signal and an output signal from reference signal generating circuit 12.

The video signal which is produced from video demodulator 6 is supplied to a time axis compensation circuit 13, which is configured to apply time axis compensation to that video signal, by variation of a signal delay time. This can be done by employing a variable delay element such as a CCD (Charge Coupled Device). The amount of delay produced by the variable delay element is determined in accordance with the phase difference between the sync signal contained in the video signal and the output signal from the reference signal generating circuit 12. After being subjected in this way to time axis compensation in the time axis compensation circuit 13, the video signal is transferred through a video signal processing circuit 14, in which processing such as character insertion, video muting, blue image insertion, etc, is carried out. The video signal is then supplied to a video output terminal.

A video area detector 15 serves to detect when the data detection point of pickup 3 has reached a video area, and can include for example a reflective or transmissive type of photo-coupler whereby light emitted from a photo-emissive element is reflected or transmitted to fall upon a photo-receptive element when the pickup 3 reaches a predetermined position. A video area detection signal is thereby produced from the video area detector 15 and is supplied to the system controller 16. The system controller 16 is also supplied with a signal which varies in accordance with the status of the video/CD designation switch. The system controller 16 consists of one or more microcomputers (i.e. microprocessors), and reads in various types of data, e.g. indicating that a musical item is being played, the playing operation is intermediate between successive musical item, musical item numbers, performance time, etc, based upon control signal which are contained in data supplied from the decoder 4. The system controller 16 thereby issues various commands to the optical servo circuit 9, spindle servo 10, clock signal generating circuit 8, etc, in accordance with switch actuations performed on an operating section (not shown in the drawings), which includes the video/CD designation switch.

Figure 2:
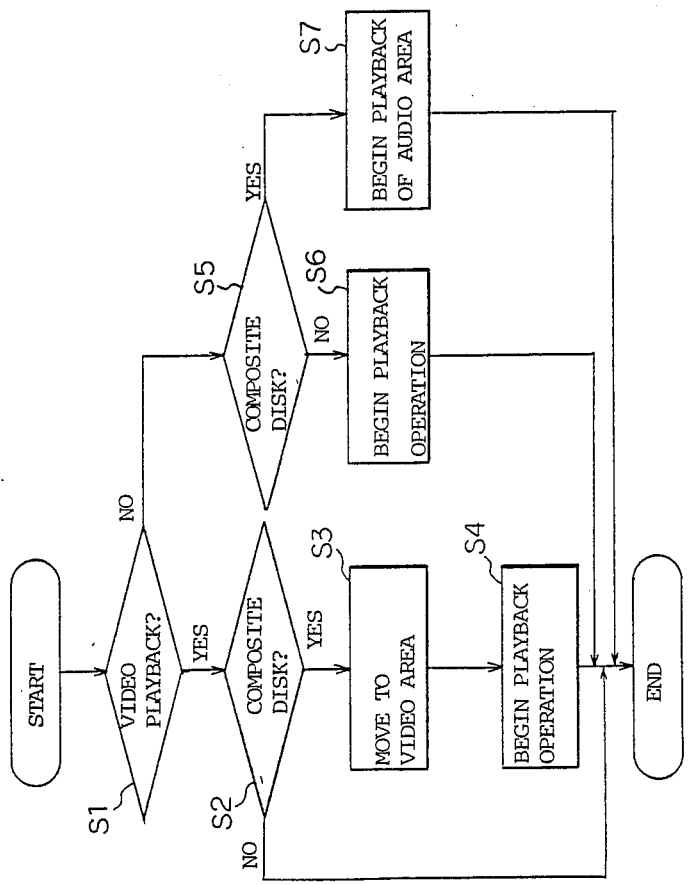
FIG. 2 is a flow chart for describing the operation of the embodiment of FIG. 1.

Processing by the microcomputer of system controller 16 is executed in accordance with a program, which includes the subroutine whose flowchart is shown in FIG. 2. Specifically, when a switch on the operation section (not shown in the drawings) is actuated, thereby generating a "play" operation command, the processor of the microcomputer judges whether or not playback of a video area has been designated, with this judgement being based upon the status of the video/CD designation switch (step 1). If it is judged in step 1 that the video area has been designated, then the processor judges whether or not the disc 1 is a composite disc, with this judgement being based upon the TOC which is recorded in the lead-in area. (step 2) If it is judged in step 2 that the disc 1 is not a complete disc, then the processor returns execution to the main routine. If it is judged in step 2 that disc 1 is a composite disc, then execution moves to step 3, and the data detection point of pickup 3 is moved to the video area. The processor then initiates playing operation (step 4), and execution then returns to the main routine. If a video area detection signal is generated during the execution of steps S3 or S4, then the processor executes interrupt processing whereby servo changeover commands are issued to the optical servo circuit 9, spindle servo 10 and clock signal generating circuit 8.

If it is judged in step 1 that video area playback is not disignated, then the processor judges whether or not disc 1 is a composite disc, on the basis of the TOC which is recorded in the lead-in area (step 5). If it is judged in step 5 that the disc 1 is not a composite disc, then the processor institutes restart of playing operation (step 6), and execution returns to the main routine. However If it is judged in step 5 that disc 1 is a composite disc, then execution moves to step 7, whereby playing operation is started for readout of only data which is recorded within the area of the disc which contains audio data recorded in digital form (as described in detail hereinafter), this area being referred to in the following as the CD area, i.e. excluding the video area. Execution then returns to the main routine.

In this way, when readout of recorded data from the video area of a composite disc is to be performed, a video area detection signal is generated and servo changeover commands are issued as a result of the processor operation, In response to the servo changeover commands, the respective gains of the focus servo amplifier, tracking servo amplifier, and carriage servo amplifier are increased, in order to compensate for a reduction of the effective gains of these servo systems when high frequency error signals are supplied to these as a result of video area playback operation. This loss of effective gain is due to the effects of components which act as integrator elements within the respective servo systems, such as actuators, etc. In this way, improved control of positioning of the data detection point is attained.

FIG. 3 is a block circuit diagram of a second embodiment of a data recording disc playback apparatus according to the present invention. For simplicity of description, only the video playback processing circuit 5 is shown, with the remaining components of this embodiment (i.e. the disc 1, spindle motor 2, pickup 3, decoder 4, D/A converter 7, clock signal generating circuit 8, optical servo circuit 9, spindle servo 10, video area detector 15, system controller 16 and 17) being identical to those of the first embodiment of FIG. 1, and interconnected as shown in FIG. 1. In the second embodiment, the RF signal which is prdouced from pickup 3 is supplied to a time axis compensation circuit 13', and an output RF signal thereby produced from time axis compensation circuit 13' is supplied to a video demodulator 6, for video signal demodulation. The demodulated video signal is transferred through video signal processing circuit 14 to be supplied to a video output terminal, and is also supplied to the rotation control circuit 11.

As for the time axis compensation circuit 13 in the embodiment of FIG. 1, the time axis compensation circuit 13' is configured to apply time axis compensation to the RF signal by variation of a signal delay time which is produced by a variable delay element such as a CCD, in accordance with a phase different between the sync signal contained in the video signal and the output signal of the reference signal generating circuit 12. Furthermore, as in the embodiment of FIG. 1, the rotation control circuit 11 performs phase comparison between the output signal from reference signal generating circuit 12 and the sync signal which has been separated from the video signal, and generates a spindle error signal in accordance with the amount of phase difference found by this comparison. The spindle error signal is supplied to the spindle servo 10.

The operation of this second embodiment is similar to that of FIG. 1.

FIG. 4 is a block circuit diagram of a third embodiment of the present invention. Only the video playback section 5 is shown, and the remaining circuit component are as shown in FIG. 1 and are connected as shown in FIG. 1. In the third embodiment, a video signal produced from video demodulator 6 is supplied directly to a video output terminal, and is also supplied to the rotation control circuit 11 and to an time axis compensation signal generating circuit 18. As in the embodiment of FIG. 1, the rotation control circuit 11 performs phase comparison between the output signal from reference signal generating circuit 12 and the sync signal which has been separated from the video signal, and generates a spindle error signal in accordance with the amount of phase difference found by this comparison, with the spindle error signal being supplied to the spindle servo 10. Furthermore, the time axis compensation signal generating circuit 18 is configured such as to produce as output a time axis error signal, in accordance with the phase difference between the separated video sync signal and the output signal from reference signal generating circuit 12. The time axis error signal is supplied to a tangential servo amplifier 21, to drive a tangential mirror within pickup 3. Tangential/spindle servo means are thereby configured by the tangential servo 21 and spindle servo 10, for controlling the velocity of displacement of the data detection point of pickup 3 with respect to disc 1. More specifically, time axis compensation is applied through coarse control of the velocity of displacement of the data detection point, executed by spindle servo 10, and fine control of that velocity which is executed by the tangential servo 21.

The operation of the embodiment is otherwise identical to that of the embodiment of FIG. 1.

Figure 5:
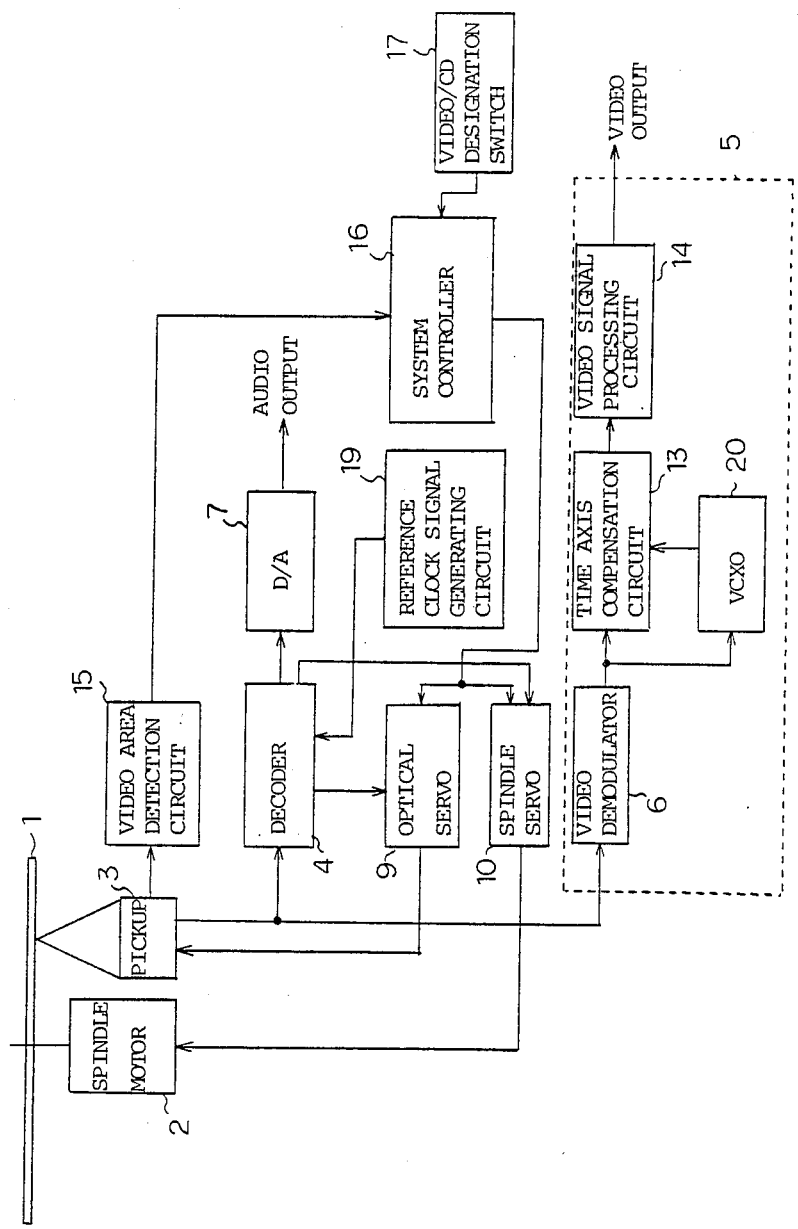
FIG. 5 is a block circuit diagram of a fourth embodiment of a data recording disc playback apparatus according to the present invention.

FIG. 5 is a block circuit diagram of a fourth embodiment of a data recording disc playback apparatus according to the present invention. In FIG. 5, a disc 1, spindle motor 2, pickup 3, decoder 4, video demodulator 6, D/A converter 7, optical servo circuit 9, spindle servo 10, time axis compensation circuit 13, video signal processing circuit 14, video area detector 15, system controller 16, and video/CD designation switch are mutually interconnected in the same way as the embodiment of FIG. 1. However in the embodiment of FIG. 5, a reference clock signal having a specific frequency, produced from a reference clock signal generating circuit 19, is supplied to the decoder 4. In addition, the spindle servo 10 is responsive to a servo changeover command issued from the system controller 16 for increasing the gain of the servo amplifier which amplifies the spindle error signal. Furthermore, the time axis compensation circuit 13 is supplied with the output signal from clock signal generating circuit 20. The clock signal generating circuit 20 includes a quartz crystal vibrator, which oscillates in synchronism with the sync signal contained in the video signal which is produced from the video demodulator 6.

With the configuration described above, when the data detection point of pickup 3 reaches the video area of a composite disc, a video area detection signal is produced from the video area detector 15, whereby a servo changeover signal is produced from system controller 16. When this occurs, the respective equalization characteristics and degrees of amplification of the servo amplifiers of the optical servo circuit 9 and the servo amplifiers of the spindle servo 10 are varied such as to provide optimum control of positioning the data detection point of pickup 3 with respect to the disc 1 and control of the velocity of displacement of the data detection point with respect to disc 1.

Figure 6:
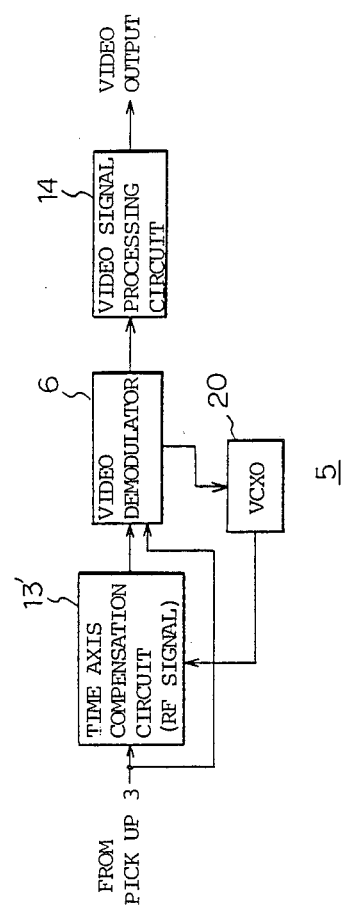
FIG. 6 is a partial block circuit diagram of fifth embodiment of a data recording disc playback apparatus according to the present invention.

FIG. 6 is a block circuit diagram of a fifth embodiment of a data recording disc playback apparatus according to the present invention. In FIG. 6 only the video playback processing circuit 5 is shown. The remaining circuit components (i.e. the disc 1, spindle motor 2, pickup 3, decoder 4, D/A converter 7, optical servo circuit 9, spindle servo 10, video area detector 15, system controller 16, and reference clock signal generating circuit 19) are identical to those of FIG. 5, and are identically interconnected to those of FIG. 5, and so are omitted. In this embodiment, the RF signal produced from pickup 3 is supplied to the time axis compensation circuit 13', and the output RF signal from time axis compensation circuit 13' is supplied to video demodulator 6 to produce a demodulated video signal. This video signal is transferred through video signal processing circuit 14 to a video output terminal, and is also supplied to a clock signal generating circuit 20. The output signal from clock signal generating circuit 20 is supplied to a clock input terminal of the time axis compensation circuit 13'. In other respects, the operation of this embodiment is identical to that of FIG. 5, described above.

FIG. 9 shows a block circuit diagram of a sixth embodiment of the present invention. In FIG. 9, a disc 1 is rotated by a spindle motor 2, and data recorded on the disc are read out by pickup 3. The pickup 3 includes a laser diode serving as a light source, an optical system including an object lens, a photo-detector for receiving light reflected from disc 1, a focus actuator for controlling the position of the object lens with respect to a data recording surface of disc 1, a tracking actuator etc. for controlling movement of the light spot formed by pickup 3, i.e. the data detection point, along a radial direction of disc 1. The output RF signal from the pickup 3 is supplied through an RF amplifier 24, to a focus error signal generating circuit 25 and a tracking error signal generating circuit 26. The RF signal from RF amplifier 24 is supplied toa video data demodulation system 27 and to a digital data demodulation systems 28.

The video data demodulation system 27 includes a video demodulator 27a for demodulating the playback RF signal from RF amplifier 24, to produce a video signal, which is supplied to a time axis compensation circuit 27b. The time axis compensation circuit 27b includes a variable delay element such as a CCD (Charge Coupled Device), and applies time axis compensation by variation of an amount of time delay in accordance with a control signal which is supplied from a time axis control circuit 27c. The time axis control circuit 27c produces a control signal as output, in accordance with a phase difference between an oscillator output signal produced from a quartz crystal oscillator circuit (VCXO 27d) and a signal produced by frequency division of that oscillator output signal, and the horizontal sync signal and color burst signal contained in the video signal after transfer through the time axis compensation circuit 27b. The clock signal generating circuit 27d oscillates in synchronism with the horizontal sync signal contained in the video signal form video demodulator 27a. A specific example of a configuration for such a time axis compensation circuit is given in Japanese Patent Laid-Open No. 56-102182. Detailed description will therefore be omitted. After being subjected to time axis compensation in the time axis compensation circuit 27b in this way, the video signal is transferred through video signal processing circuit 27e, to be supplied to a video signal output terminal 29. The video signal processing circuit 27e executes processing which includes video muting (whereby the video signal is selectively inhibited from transfer to output terminal 29), characteristic insertion or blue picture insertion, based upon characteristic data supplied from the character generator 27f.

The digital data demodulation system 28 includes a selector switch 28a, whose connection status is determined in accordance with the disc area (i.e. CD are of video area) which is being played, during playback of a composite disc. During playback of a CD area, switch 28a is set to the a position thereof, and is set to the b position during playback of a video area. Changeover operation of switch 28a is performed in response to a changeover command which is issued from the system controller 47 (described hereinafter). When a composite disc is being played, the speed of rotation of the disc will differ substantially, depending upon whether the CD are or the video area is being played. Furthermore, the PCM audio signal will be, for example, an EFM (Eight to Fourteen Modulation) digital signal, which is superimposed upon an FM modulation video signal at the time of recording the disc. Since the EFM signal has an adverse effect upon the low frequency components of the FM video signal, the EFM signal is recorded at a level which is lower than the video carrier level by several tens of dB, although the degree of modulation is the same for both the EFM and video signals. This is illustrated in FIG. 7. Thus, the frequency characteristic and amplitude of a playback EFM signal will both be different, for the cases of CD area playback and video area playback respectively. However with the present invention, a common demodulated system is used for both forms of EFM signal playback. This is made possible by switching which is applied to the signal processing systems for EFM signals of the CD area and the video area respectively.

During playback of the CD area, the playback RF signal is an EFM signal, which is subjected to frequency characteristic compensation by the equalizer circuit 28b, having a predetermined equalizer characteristic, and is amplified by a predetermined amount of gain by amplifier 28c. During playback of the video area, on the other hand, the playback RF signal is an FM video signal which is combined with an EFM signal. The EFM signal is extracted from the playback RF signal by an EFM extraction circuit 28d (e.g. a low-pass filter), then is subjected to frequency characteristic compensation by the equalizer circuit 28e, which has a different equalization characteristic from the equalizer circuit 28b, to be then amplified in amplifier 28f, which has a higher gain than that of amplifier 28c. In this way, an EFM signal is derived whose frequency characteristic and amplitude are identical to those of the EFM signal obtained during CD area playback.

During playback of a CD disc, the selector switch 28a is held in position a.

The playback EFM signal selected by the selector switch 28a is supplied to demodulation and error correction circuit 28g, which performs demodulation of the EFM signal, and write-in of the demodulated signal to a memory (not shown in the drawings) such as a RAM (random access memory), and also performs control of this RAM based upon a reference clock signal produced from an reference clock signal generating circuit 28h, to perform data operations for executing data interleaving and error checking, by using parity bits contained in the data. The demodulation and error correction circuit 28g also performs frequency division of the reference clock signal from reference clock signal generating circuit 28h, and frequency division of the frame sync signal which is detected in the EFM signal, and detects the amount of phase difference and frequency difference between the resultant frequency-divided signals. The demodulation and error correction circuit 28g thereby produces a spindle error signal, in accordance with these phase and frequency differences, which is supplied to an equalizer circuit 42, and also produces an error-corrected digital audio signal which is processed in an audio signal processing circuit 28i, consisting of a D/A converter, a de-glitcher circuit, etc, and is then supplied to a pair of left and right-channel audio signal channel output terminals 30L and 30R.

A focus error signal generating circuit 25 serves to detect an amount of deviation in the vertical direction of the light spot which is focussed on the recording surface of disc 1, with respect to that recording surface, and produces a focus error signal by for example utilizing astigmatic aberration. The tracking error signal generating circuit 26 on the other hand serves to detect an amount of deviation of the light spot with respect to the recording surface of disc 1, along the direction of a radius of the disc, and produces a tracking error signal by a known detection method such as the 3-beam method. The output signals from the focus error signal generating circuit 25 and the tracking error signal generating circuit 26 are applied to equalizer circuits 31 and 32 respectively, which perform compensation of the frequency characteristics of the respective error signals, and are then transferred to amplifiers 33 and 34 respectively, and then supplied to drivers 35 and 36. The resultant outputs from drivers 35 and 36 are drive signals which are respectively supplied to a focus actuator and tracking actuator (not shown in the drawing), which are built-into the pickup 3.

As mentioned hereinabove, the speed of rotation of a composite disc is extremely different during playback of a CD area and a video area respectively (as illustrated in FIG. 8). During playback of the video area, the disc acceleration values which are used for focussing and tracking are therefore increased, by comparison with the values which are utilized during CD area playback.

To perform tracking and focussing compensation, the equalization characteristics of equalizer circuits 31 and 32 and the gains of amplifiers 33 and 34, used in the focus and tracking servo systems, are respectively changed over, for playback of a CD area and a video area respectively. This changeover is executed by switching of elements within the respective equalizer circuits and amplifier circuits. Specifically, when changeover is executed from CD area to video area playback operation, servo changeover commands are issued by the system controller 47, whereby the equalization characteristics of the equalizer circuits 31 and 32 are changed such as to provide appropriate frequency characteristics for the respective error signals. In addition, the gains of amplifiers 33 and 34 are respectively increased, to provide the appropriate amplifiers for the respective error signals. In this way, although the frequencies of the respective error signals are increased during video area playback, by comparison with CD area playback, satisfactory focussing and tracking operation are attained in the same way as during CD area playback.

With the present embodiment, changeover of the respective equalization characteristics of the equalizer circuits 31 and 32 and of the respective gains of amplifiers 33 and 34 are executed by switching of elements within the circuits 31 to 34. However it would be equally possible to provide separate equalizer circuits and amplifiers having appropriate fixed equalization characteristics and gain values for each of the servo systems, with the appropriate equalizer circuits and amplifiers being selected for CD area and video area playback respectively.

The tracking error signal produced from the tracking error signal generating circuit 26 is supplied to an LPF (low-pass filter) 37, to derive the low-frequency components of that signal. The low-frequency components are then supplied through equalizer circuits 38 and 39 to driver 40, which thereby produces a drive signal for driving a carriage motor 41. The carriage motor 41 constitutes a motive source for a carriage (not shown in the drawings) which moves pickup 3 along a radial direction of disc 1. A carriage servo system is thereby configured. In addition, the spindle error signal produced from the demodulation and error correction circuit 28g in the digital data demodulation system 28 is transferred through equalizer circuit 42 and amplifier 43 to be supplied to driver 44, whereby a drive signal is produced for driving spindle motor 2 to rotate the disc 1. A spindle servo system is thereby configured.

As in the case of the focus and tracking servo systems, changeover of the equalization characteristics of equalizer circuits 38 and 42, and the gains of amplifiers 39 and 43 in the carriage servo circuit and spindle servo circuit, is executed for playback of the video area and CD area respectively, to thereby ensure stable servo circuit operation during video area playback. Changeover of the respective equalization characteristics and gains is executed by switching of elements within the equalizer circuits and amplifier circuits. However it would be equally possible to provide separate equalizer circuits and amplifiers having appropriate fixed equalization characteristics and gain values for each of the servo systems, and to arrange that the appropriate equalizer circuits and amplifiers are selected for CD area and video area playback respectively.

The present embodiment has been described on the assumption that the focus, tracking, carriage and spindle servo systems are all selectively changed in accordance with CD area playback operation and video area playback operation. However in some cases it may be possible in practice to obtain satisfactory results by executing changeover of the equalization characteristic and amplifier gain of only one (but at least one) servo circuit, for example the tracking servo circuit.

During search operation, the tracking servo loop is held in the open state, and track jumping by one track at a time is executed by applying kick pulses A and brake pulses B, as shown in FIG. 10(a), to the tracking actuator. In addition as shown in FIG. 11(b), track jumping over a number of tracks at one time, e.g. 10 to 100 tracks, is executed by applying a pulse C to the carriage motor 41 in addition to the pulses A and B applied to the tracking actuator, as is well known in the art. The kick pulses A, brake pulses B and drive pulses C are produced by the system controller 47, and are supplied to the drivers 36 and 40. FIG. 10(b) shows the waveform of the tracking error signal as the light spot of pickup 3 moves laterally across one track. The forms of pulses A, B and C are respectively changed over for CD area and video area playback operation, in accordance with the different speeds of disc rotation which are used. Specifically, if there is disc eccentricity, then since the speed of rotation of the disc during video area playback is high, the time required to complete each jump operation must be made shorter than in the case of CD area playback, in order to reduce the adverse effects of disc eccentricity. For this reason, the widths a, b and c of pulses A to C respectively are made greater during video area playback than during CD area playback, to thereby increase the amount of drive power which is supplied to the tracking actuator and the carriage motor 41 during each pulse. The determination of the widths of pulses A, B and C and changeover of the pulse widths between CD area and video area playback operation respectively can be easily implemented by the microcomptuer which constitutes the system controller 47. Instead of performing changeover of the respective widths of pulses A, B, and C, it would be equally possible as shown in FIG. 12, to vary the peak amplitudes d and e (shown in FIGS. 10 and 11) in accordance with video area and CD area playback. This can be accomplished as shown by using changeover switches 34a and 34b, to select the appropriate peak values of pulses A, B and C respectively, to be supplied to the tracking actuator and to the carriage motor 41.

The assignee of the present invention has found from practical experiment that optimum operation can be obtained during single-track jumping, by making the peak value d of kick pulses A and brake pulses B larger during video area playback than during CD area playback, and making the pulse width of the brake pulses B more narrow during video area operation than during CD area operation.

The position detector 46 serves to detect when the light from pickup 3 reaches a position corresponding to the boundary between the CD area and the video area of a composition disc, as pickup 3 moves radially across the disc, and produces a corresponding detection signal. This signal indicates that the pickup 3 has reached the video area. Since the position detector 46 functions to detect the position of pickup 3 during movement of the pickup, it is undesirable that position detector 46 should apply a load to pickup 3, and should therefore preferably consist of a combination of a photo-emissive and a photo-receptive element, with light from the photo-emissive element being transmitted to (or shielded from) the photo-receptive element when the pickup 3 attains a predetermined position. Thus, the position detector 46 can consist of a reflective or transmissive type of photocoupler. Alternatively, the position detector 46 can include a slider form of potentiometer which is coupled to move with pickup 3, and which produces an output signal in accordance with the amount of displacement of pickup 3, together with a converter which receives the output signal from the potentiometer and compares that signal with a reference value signal, to produce an output signal indicating that the pickup 3 has reached a predetermined position when the potentiometer output signal coincides with the reference value signal. The sensing position can for example be the position at which the light spot of pickup 3 reaches the audio lead-out area shown in FIG. 8, the boundary between the audio lead-out area and the video lead-in area, a position which is within the video lead-in area, the boundary between the video lead-in area and the video program area, or a position within the video program area. However, from considerations of mechanical error and deviations between different discs, it is preferable that the sensing position be made an intermediate position within the video lead-in area.

The detection signal produced from position detector 46 is supplied to the system controller 47. The system controller 47 also receives disc designation data from the operating section 48, which indicates whether the disc to be played is a CD or a composite disc, as well as mode designation data which indicates (during playback of a composite disc) whether playback of the CD area alone, playback of the video area alone, or playback of both of these regions is to be performed. Selection of this mode designation data can be performed, for example, by toggle operation of a tactile switch or changeover operation of a slider switch or pushbutton switch, provided in the operating section 48. Alternatively, selection of the mode designation data can be performed by remote control, irrespective of the operating section 48, e.g. by using a wireless remote control unit or a wired remote control unit.

Since the system controller 47 is based on a microcomputer, it executes various functions, including interchange of data between the video data demodulation system 27 and the digital data demodulation system 28 via a bus 45, and also generates changeover commands for selector switch 28a of the digital data demodulation system 28 and for the equalizer circuits and amplifiers of the respective servo systems, in accordance with detection signals from the position detector 46. The system controller 47 also generates commands for driver 50 of motor 59, which is the motive source for a loading mechanism (not shown in the drawings) which executes automatic transfer of a disc between a disc entry aperture in the outer case of the playback apparatus and the disc playing position. The system controller 47 also is supplied with FG (Frequency Generator) pulses which are produced by a frequency generator 52 that is coupled to the spindle motor 2. The system controller 47 counts a number of clock pulses having a specific frequency, which occur within one period between successive FG pulses, an computes the speed of rotation of the spindle motor 2 (i.e. the speed of rotation of disc 1) based upon this count value and the clock pulse frequency.

Figure 13:
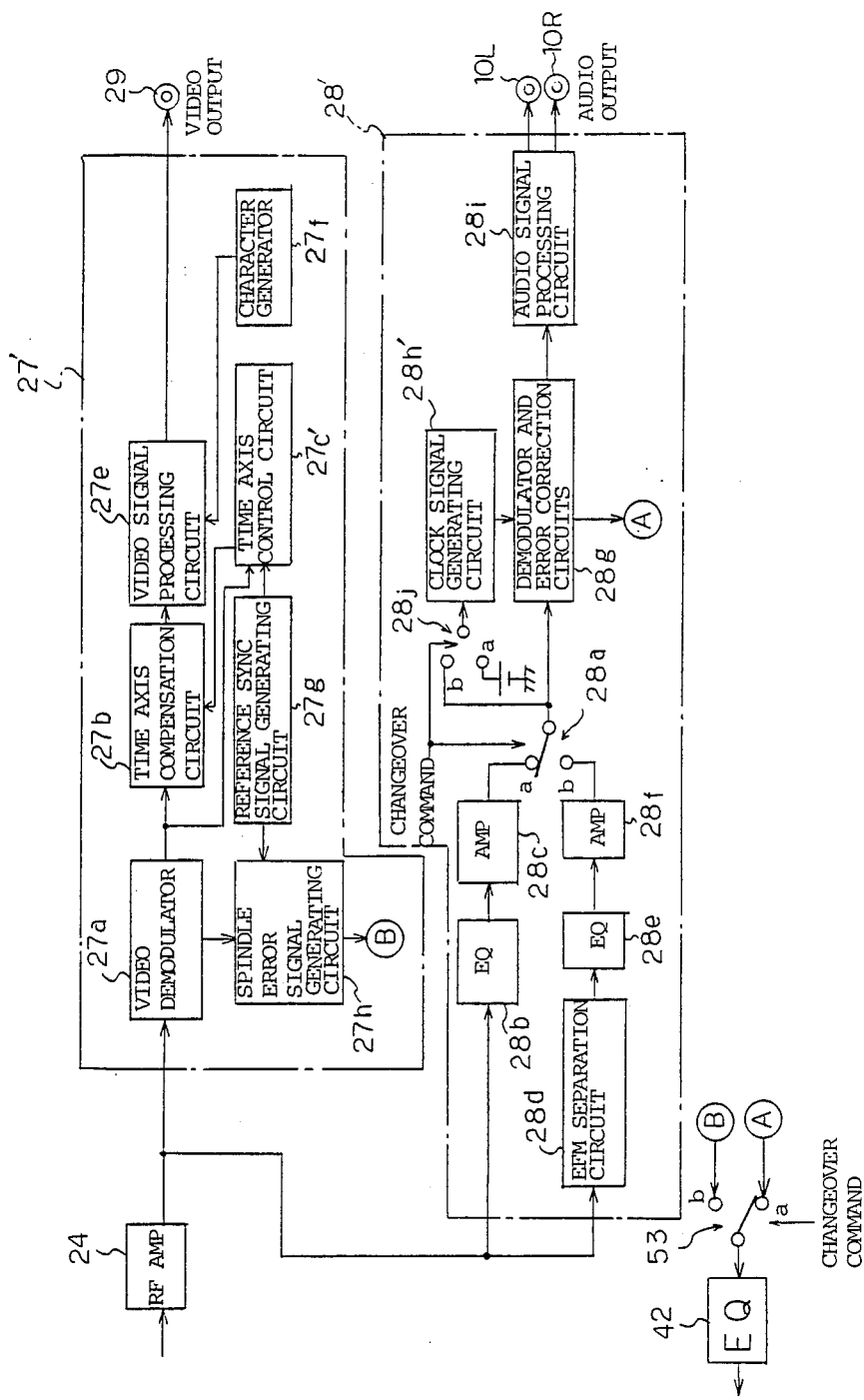
FIG. 13 is a partial block circuit diagram of a seventh embodiment of a data recording disc playback apparatus according to the present invention.

In the embodiment described above, irrespective of the area of the composite disc which is being played, the demodulation and error correction circuit 28g of digital data demodulation system 28 generates a spindle error signal in accordance with the phase difference between the frame sync signal within the EFM signal and a reference clock signal, and controls the speed of rotation of spindle motor 2 based upon this error signal. As shown in FIG. 13, the configuration is such that control of the rotation of spindle motor 2 is executed in accordance with an error signal produced from the demodulation and error correction circuit 28g of digital data demodulation system 28, during CD area playback, while control of spindle motor 2 rotation is executed in accordance with a phase difference between the horizontal sync signal in the video signal and a reference horizontal sync signal during video area playback.

More specifically, as shown in FIG. 13, the time axis control circuit 27c' of a video data demodulation system 27' controls a time axis compensation circuit 27b in accordance with a phase difference between a reference horizontal sync signal produced from the reference sync signal generating circuit 27g and a playback horizontal sync signal which is separated from the video signal. Furthermore, the spindle error signal generating circuit 27h performs phase comparison between the horizontal sync signal separated from the video signal (prior to application of time axis compensation to the video signal) and the reference horizontal sync signal, to derive the phase difference between these sync signals, and produces a phase difference signal which is supplied as a spindle error signal to one input of the changeover switch 53. A changeover switch 28j is set to the a position thereof during CD area playback, and to the b thereof during video area playback, under the control of a changeover command from the system controller 47. A clock signal generating circuit 28h' of digital signal processing system 28' is controlled by the output from switch 28j to generate a reference clock signal having a predetermined frequency during CD area playback, and a clock signal which is synchronized with the playback clock signal contained in the EFM signal, during video area playback. Error correction, etc, are performed on the basis of the clock signal which is produced from 28h', while in addition the differences in frequency and phase between the reference clock signal and the frame sync signal during CD area playback are used to derive a spindle error signal which is supplied to the other input of switch 53. The switch 53 is controlled by a changeover command from system controller 47 such as to be set to the a position thereof during CD area playback, and to the b position during video area playback. Spindle servo control is executed based on the spindle error signal which is derived by the demodulation and error correction circuit 28g of the digital data demodulation system 28, during CD area playback, and an spindle error signal determined by the phase difference between the playback horizontal sync signal and a reference horizontal sync signal during video area playback.

Figure 17:
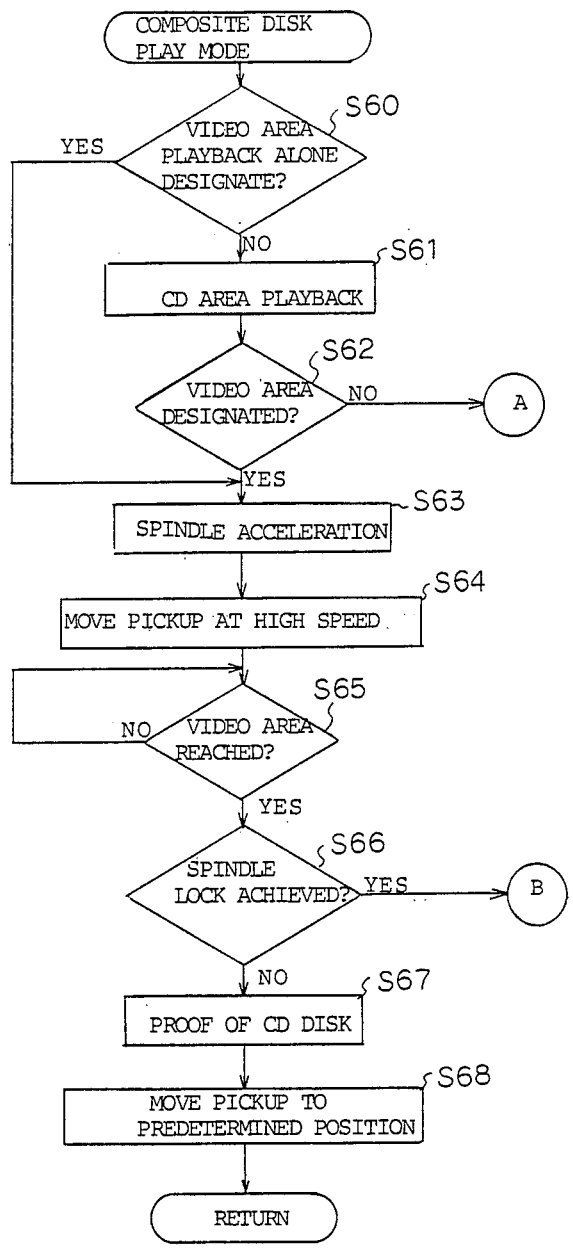

Operating sequences which are executed by the microcomptuer constituting system controller 47 of this embodiment of the invention during composite disc playback operation will now be described, referring to the flowcharts of FIGS. 17 through 17.

As shown in FIG. 8, a composite disc includes a CD area and a video area, with each of these regions having a lead-in area. Each lead-in area includes a TOC (table of contents) recorded therein, which expresses the program contents of that area. In addition, the TOC of an audio area includes data which indicates whether or not the disc is a composite disc. Furthermore the NTSC standard is used as a color television standard mainly in Japan and the U.S.A., while the PAL standard is used mainly in European countries. Both of these standards are utilized in composite discs, and therefore the TOC of an audio lead-in area indicates whether the disc contains data in accordance with the NTSC standard or the PAL standard. Basically, NTSC standard composite discs must be played on NTSC standard playback apparatus, while PAL standard composite discs must be played on a PAL standard playback apparatus.

The following description will be given for the case of a disc player which employs the NTSC standard. Referring to FIG. 14, it will be assumed that the disc has already been set in the playing position. In this condition, when a start command is issued from the operating section 48, then firstly the carriage motor 41 is activated to move pickup 3 to the innermost peripheral position of the disc recording area (step 1). A sensor switch is provided for sensing when this innermost peripheral position has been reached, and when this is sensed, focussing of pickup 3 is performed. The TOC data of the lead-in area at the disc inner periphery is then read in (step 2). After completion of playback of the lead-in area, a judgement is made as to whether or not the TOC data has been read in. If it is judged in step 3 that the TOC data has been read in, then the processor judges whether or not the disc is a composite disc, based upon the contents of the TOC. (step 4). A decision is then made as to whether or not the disc is an NTSC standard disc (step 5).

If the disc is found not to be a composite disc in step 4, then since this indicates that the disc must be a CD disc, operation is changed to the CD play mode (step 6). If it is judged in step 5 that the disc is a NTSC type, then operation changes to the NTSC sandard composite disc play mode (step 7). On the other hand, If it is judged in step 5 that the disc is not of NTSC standard, then operation moves to the PAL standard composite disc play mode (step 8). Furthermore, if it is found in step 3 that the TOC data could not be read, e.g. due to some reason such as damage or dust on the disc, then it will not be possible to determine the type of disc, and so it is provisionally assumed that the disc to be played is a composite disc, and the composite disc play mode is entered (step 9). When each of the above play modes is entered, then an operating sequence is executed, as shown in flow charts described hereinafter. However the playback operation of the CD play mode (step 6) is well known, and therefore description of this will be omitted.

Upon completion of the sequence of operations of a play mode, execution returns to the main program flow, and A decision is then made as to whether or not playback of all of the program data has been completed (step 10). If data playback has been completed, then the carriage motor 41 is driven to move the pickup to its home position, (step 11), and loading motor 49 is driven whereby a loading mechanism (not shown in the drawings) performs disc ejection (step 12). This completes the operating sequence.

Playback operation in the NTSC standard composite disc play mode (step 7) will be described referring to the flow chart of FIG. 15. During playback of a composite disc, the area (or areas) of the disc which is required to be played is designated by the user, e.g. by actuation of a switch on operating section 48. A decision is made as to whether the video area alone is to be played, with this decision being made in accordance with mode designation data which are supplied from the operating section 48. This data may designate playback of only the CD area, playback of only the video area, or playback of both the video area and the CD area (step 20). If playback of the video area alone is not designated, the CD area playback is initiated (step 21). During playback of the CD area, audio data will of course by played back. However a "blue picture" may also be produced to be displayed on a television monitor (not shown in the drawings), based on "blue picture" data produced from character generator 27f, as a result of signal switching operations executed by video signal processing circuit 27e of video data demodulation system 27. When it is detected that playback of the CD area has been completed (step 22), then the processor judges whether or not playback of the CD area alone is designated, based on the mode designation which is then read in (step 23). If CD area playback alone is designated, then execution returns to the main flow, shown in FIG. 14. It should be noted that if CD area playback alone is designated, then search, scan, program play, and repeat operations, etc., will only be possible within the CD area.

If it is judged in step 23 that playback of the CD area alone is not designated, then this signifies that playback of both the video area and CD area is designated, and therefore the spindle motor 2 is accelerated towards the maximum rated speed of rotation (step 24). When it is detected that the data sensing light spot of pickup 3 has reached a specific position, e.g. a central position in the video lead-in area, (this detection being based on a detection output from position detector 46) (step 25), read-in of the video TOC data from that lead-in area is initiated (step 26), then the processor judges whether or not the TOC data has been read in (step 27). If it is judged in step 26 that this data has not been read in, then this is judged to indicate that the position at which the data detection point has halted is past the video lead-in area. The tracking actuator of pickup 3 is then driven to execute a jump back by the data detection point over a predetermined number of tracks (step 28). Execution then returns to step 26, and read-in of the playback TOC data is again attempted. Steps 26, 27, and 28 are repetitively performed until it is judged in step 27 that the TOC data has been read in. When this occurs, execution moves to video area playback operation (step 29). Both an FM modulated video signal and a PCM audio signal superimposed thereon are recorded in the video area, and both of these signals are played back during video area playback. If it is judged that the position at which the light spot of pickup 3 (i.e. the data detection point) has halted is past the video lead-in area, but that it has been possible to read in the program data, then since position data for the light spot can be derived on the basis of the data which have thus been read in, it is possible to compute a jump quantity (using this position data) whereby the light spot will be brought within the video lead-in area by jumping backward. Furthermore, since identical TOC data are repetitively recorded within the video lead-in area, it is not necessary for read-in of this data to begin at the leading part of that lead-in area.

If playback of both the CD area and the video area is designated, then search, scan, program play, and repeat operations, etc., can be carried out for the CD area alone, or for the video area alone. In addition, search operations extending from the CD area through the video area, or extending from the video area through the CD area, can also be performed, as also can a "repeat" operation applied to both of these areas (i.e. with the program contents of both the video area and CD area being repeated.

If it is judged in step 20 that playback of only the video area is designated, then the spindle motor 2 is accelerated to its maximum rated speed of rotation for video area playback (step 30).

At the same time, the carriage motor 41 is driven for accelerated rotation, whereby pickup 3 is moved at high speed towards the video lead-in area (step 31). Execution then moves to step 25. If playback of only the video area is designated, then search, scan, program play, and repeat operations, etc., can be carried out only within the video area.

If control (address) data read-in from the video area is performed by using Q-channel data of a CD format sub-code signal, then since as described hereinabove an EFM signal is recorded in the video area at a level sufficiently lower than that of the video carrier level (see FIG. 1), the data read error rate during read-out of this control data will be approximately three times as high as during CD area playback.

However it is possible to lower the read error rate for video area playback, by executing read-in of the Q-data a plurality of times, e.g. by a maximum of three times, and examining the respective data obtained in these read-in operations for mutual correlation, to thereby judge whether of not the data are correct. If insufficient correlation is found, then these operations can be repeated until correct data are obtained. Such read-in error correction judgements are performed by the microcomputer of this embodiment of the present invention, and an operating sequence, i.e. subroutine for the process is shown in the flow chart of FIG. 18.

As shown in FIG. 18, data obtained during first, second and third successive read operations (i.e. for reading of Q-data as described above) are designated as A, B and C respectively. The addresses at which the data thus read in are successively stored are increased by one, each time new data are read in. First, data A are read in (step 70), then data B (step 71), and then the processor judges whether or not $B=A+1$ (step 72) If this condition is met, then this is judged to indicate that both data A and B are correct, and so data B (from the second read operation) is used thereafter (step 73), If there is insufficient mutual correlation between A and B, then it is judged that one of these contains errors, and a third read operation is executed to obtain data C. A decision is then made as to whether or not $C=A+2$ (step 75). If this condition is satisfied, then this is judged to indicate that both A and C are correct, and data C (read in by the third operation) are used thereafter (step 76). If the condition of step 75 is not met, then a decision is then made as to whether or not $C=B+1$ (step 77). If this condition is satisfied, then execution moves to step 76, and data C are used thereafter. If however the condition of step 77 is not satisfied, then execution returns to step 70, and the process described above is repeated.

Thus, during the sequence of operations described above, firstly, data A and B are read in, and if there is a satisfactory correlation between these, no further data read operations are performed and the data B (from the second read operation) are used thereafter. If there is insufficient correlation between A and B, then a third data read operation is performed, to obtain data C. If data C is correctly correlated with either data A or B, then C (obtained from the third read operation) is used thereafter. It should be noted that although in this embodiment a maximum of three data read operations are executed, the invention is not limited to this number.

The operating sequence for playback in the PAL standard composite disc play mode (i.e. step 8 in FIG. 14 described above) will now be described with reference to the flow chart of FIG. 16.

Figure 15:
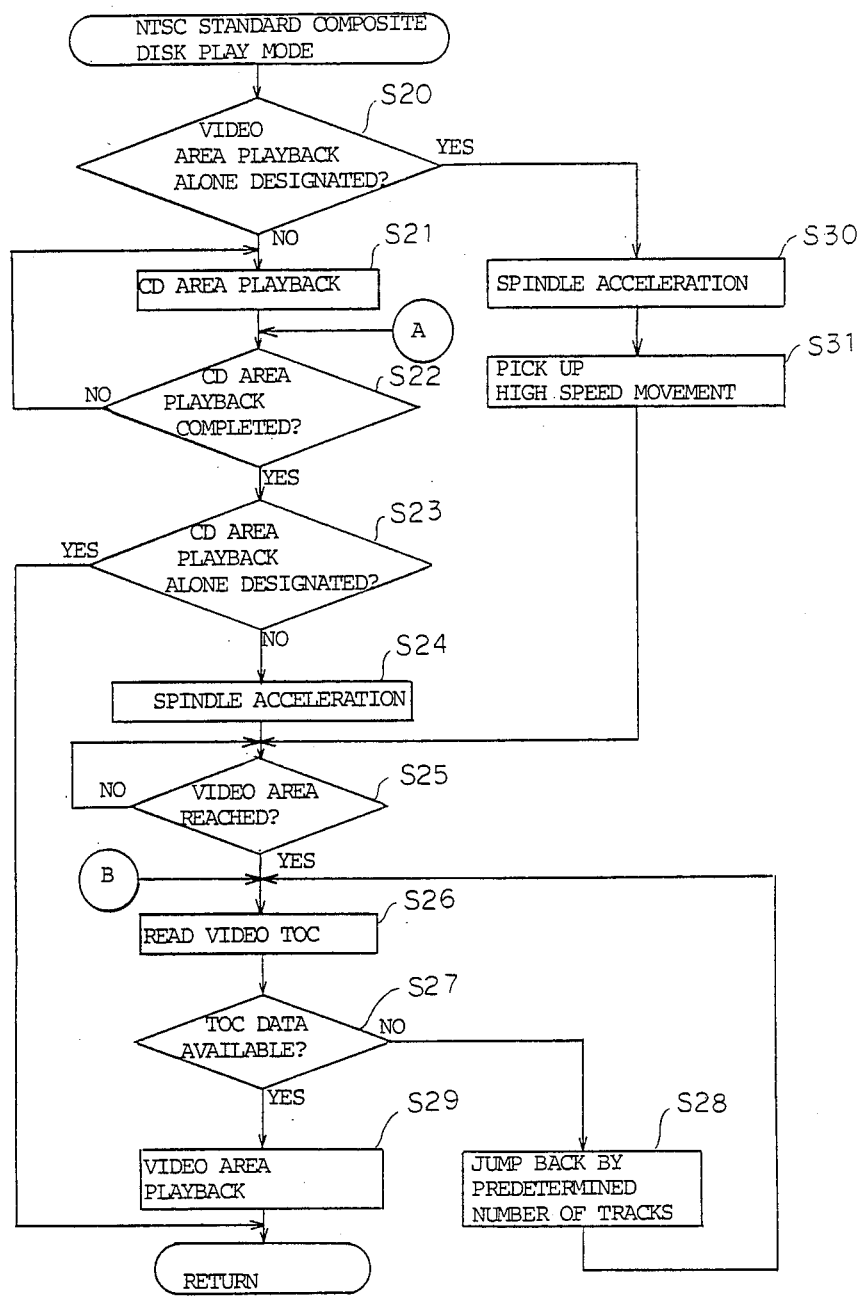
Figure 16:
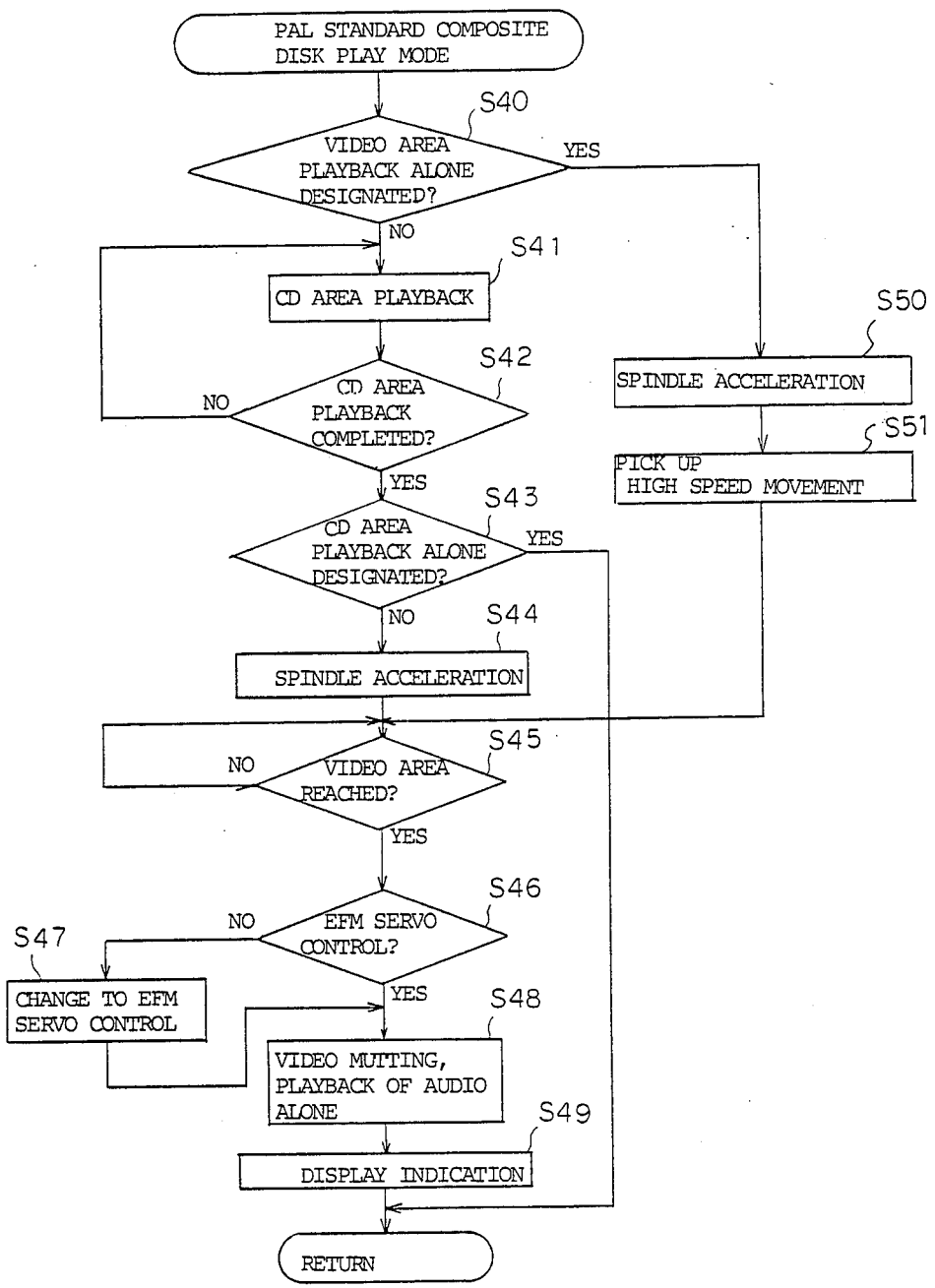

In FIG. 16, the operations in steps 30 to 45 and steps 50 and 51 are identical to the operations performed in steps 20 to 25 and 30, 31 respectively in the flowchart of FIG. 15. In step 45, sensing of a detection signal produced from position detector 46 is performed. If it is judged in step 45 that the light spot of pickup 3 is within the video area, a decision is then made as to whether or not servo control is to be applied to the spindle motor in accordance with a spindle error signal derived on the basis of the frame sync signal of the EFM signal produced by demodulation and error correction circuit 28g of digital data demodulation system 28 (step 46). Such servo control will be referred to in the following simply as EFM servo control. If it is judged that EFM servo control is to be implemented, then changeover to EFM servo control is executed (step 47). More specifically, in the playback apparatus embodiment shown in FIG. 9, the spindle servo system is placed under EFM servo control, irrespective of the playback area of the disc, whereas in the case of the playback apparatus embodiment of FIG. 13, EFM servo control is only applied during playback of the CD area, while during playback of the video area, spindle servo control is executed in accordance with a spindle error signal which is derived based on the regenerated horizontal sync signal produced from video data demodulation system 27' (this form of spindle servo control will be referred to in the following as video servo control). Changeover between EFM servo control and video servo control is automatically carried out. In the case of the embodiment of FIG. 13, a changeover operation can be executed to place the spindle servo system under EFM servo control.

If an NTSC standard playback apparatus is used to play a PAL standard composite disc, video servo control is employed during video area playback. This is due to the fact that, since the color television standards of the disc and the player apparatus are mutually different, it is not possible to achieve synchronism. Thus, not only is it impossible to execute playback of the video data, but it is also not possible to obtain the audio data which is recorded in the video area. However all discs have a common CD format, so that although playback of the video data in the video area is not possible, it will normally be possible to execute playback of the audio data in the video area by using EFM servo control. Changeover to EFM servo control for this purpose can only be performed with the embodiment of the present invention shown in FIG. 13. In such a case, since playback of the video data is not possible, muting is applied to the video output signal from video signal processing circuit 27e, and only the audio data are output (step 48). Also, at this time, an indication is produced on display unit 51, which signifies that a PAL standard composite disc has been inserted into an NTSC standard playback apparatus (step 49). Execution then returns to the main flow shown in FIG. 14. The display unit 51 can for example employ light-emitting diodes which are caused to flash. However the invention is not limited to such an arrangement. Alternatively, rather then producing an indication on display unit 51, an indication in the form of character data, for example, can be produced on a television monitor (not shown in the drawings).

The above description has been given for the case of a PAL standard composite disc being played on a NTSC standard apparatus in accordance with the above embodiment, however similar considerations will apply in the case of playback of an NTSC standard composite disc on a PAL standard playback apparatus. In that case too, it will not be possible to execute playback of video data from the video area, but playback of audio data from that area will be possible.

Furthermore, in the description of the above embodiment, playback of audio data alone from the video area is performed, when a composite disc is inserted in the playback apparatus whose television standard is different from that of the disc. However it would be equally possible to eliminate playback of any data from the video area in such a case, or to arrange that the disc is immediately ejected.

The playback operation sequence for the case in which the composite disc play mode is selected (in step 9 of FIG. 14) will be described, with reference to the flow chart of FIG. 17. Firstly, a decision is then made as to whether or not playback of the video area alone has been designated, with this decision being based on the mode designation data from operating section 48, which can designate playback of the CD area alone, playback of the video area alone, or playback of both of these (step 60). If it is judged in step 60 that the playback of the video area alone is not designated, then execution moves to CD area playback operation (step 61). During playback of the CD area, playback of audio data will of course be performed. However a "blue picture" may also be produced to be displayed on a television monitor (not shown in the drawings), based on "blue picture" data produced from character generator 27f, as a result of signal switching operations executed by video signal processing circuit 27e of video data demodulation system 27. During this CD area playback, a decision is the made as to whether or not playback of the video area alone has been designated, i.e. from the operating section 48. If this does not occur, then execution returns to step 22 of the flow shown in FIG. 15.

If video area playback is designated while CD area playback is in progress, or if it is judged in step 16 that playback of the video area alone has been designated, then the spindle motor 2 is accelerated towards the maximum rated speed of rotation for the video area (step 63). At the same time, motor 41 is set in high-speed rotation to move the pickup 3 rapidly towards the video lead-in area (step 64). A decision is then made as to whether or not the position detector 46 has issued a detection signal which indicates that the video area has been reached by the light spot (step 65), and then the processor judges whether or not the spindle servo loop has attained the lock-in status (step 66). If lock-in has been achieved, then execution moves to step 26 of the flow shown in FIG. 15. The spindle servo lock-in condition is detected by the spindle servo system (for example as described in Japanese Utility Model Laid-Open No. 57-134774), which thereupon supplies a lock-in detection signal to the system controller 47.

If on the other hand spindle servo lock is not achieved, then although the disc which is being played was provisionally judged to be a composite disc, at the point in time when the TOC contents were read (i.e. step 3 in the flow chart of FIG. 5) since spindle servo lock has not been achieved, (i.e. due to the fact that it has not been possible to derive a playback sync signal which corresponds to the reference sync signal) this proves that the disc is not in fact a composite disc, but is a CD disc (step 67). The pickup 3 is then moved to a predetermined position (step 68). Various positions can be envisaged for this predetermined position, for example in a case in which video area playback was designated while CD area playback was in progress, the predetermined position can be the position of the data detection point at the time when a change to video area playback was designated. Alternatively, the position could be the start of the musical item which was being played when the change was designated, or the start of the musical item which immediately succeeds the item which was being played when the change was designated, or (if the musucal item being played at the time of change designation was the last item of the CD area) the predetermined position can be made the start of the first musical item of the CD area. Alternatively, after it has been proved thet the disc being played is a CD disc, the playback apparatus could be set in a "stop" condition. In addition, the playback apparatus preferably includes means whereby, in the event that it is proved that the disc being played is a CD disc, subsequent designations of video area playback are ignored.

If an access, pause, stop or other operation is performed during video area playback, or if a search or other operation in the CD area is initiated, then the display appearing on the television monitor will change from the playback video picture to the "blue picture". However when this changeover is carried out, the vertical sync signal of the playback video signal and the vertical sync signal of the video signal of the "blue picture" (the latter video signal being referred to in the following as the blue video signal) will in general not be mutually synchronized in phase, so that the blue picture produced on the monitor will appear disordered.

For this reason, when changeover from display of the playback video picture to the "blue picture" is executed, then as shown in FIG. 19 the system controller 47 first acts to monitor a specific edge of the vertical sync signal pulses in the playback video signal (step 80), and then resets the character generator 27f (shown in FIG. 9) which generates the blue video signal, when that vertical sync signal pulse edge is detected. In this way, the vertical sync signal of the playback video signal and the vertical sync signal of the "blue picture" are sunchronized in phase. In the following description, the term "synchronized in phase" has the significance that specific edges (e.g. falling edges) of pulses of one vertical sync signal are made occur at precisely identical timings to the corresponding edges in the other vertical sync signal. Signal changeover from display of the playback video signal from video signal processing circuit 27e (see FIG. 9) to the "blue video" signal is then executed (step 82).

By executing signal switching in this way only after the vertical sync signal of the playback video signal and that of the blue video signal have been synchronized in phase, disorder of the displayed "blue picture" is prevented.

Conversely, when changeover is executed from display of the "blue picture" to that of the playback video picture, as a result of cancellation of the pause status, or upon completion of an access operation, or when a search is executed from the CD area through the video area, then in this case too, the vertical sync signal of the playback video signal and the vertical sync signal of the playback video signal are brought into phase synchronization, to thereby prevent disorder of the displayed playback video picture.

This synchronization is accomplished by successively adding or subtracting horizontal sync signal (H) pulses to or from the vertical sync signal of blue video signal, to thereby move that vertical sync signal gradually into phase synchronization with the vertical sync signal of the playback video signal. The number of pulses added or subtracted at one time is made sufficiently small so that no disorder is produced in the blue picture. A specific operating sequence to accomplish this will be describe with reference to the flow chart of FIG. 21. FIGS. 20(a), (b) and (c) are waveform diagrams showing the phase relationships between the hborizontal sync signal of the playback video signal, the vertical sync signal of the playback video signal, and the vertical sync signal of the blue picture signal, respectively.

Figure 21:
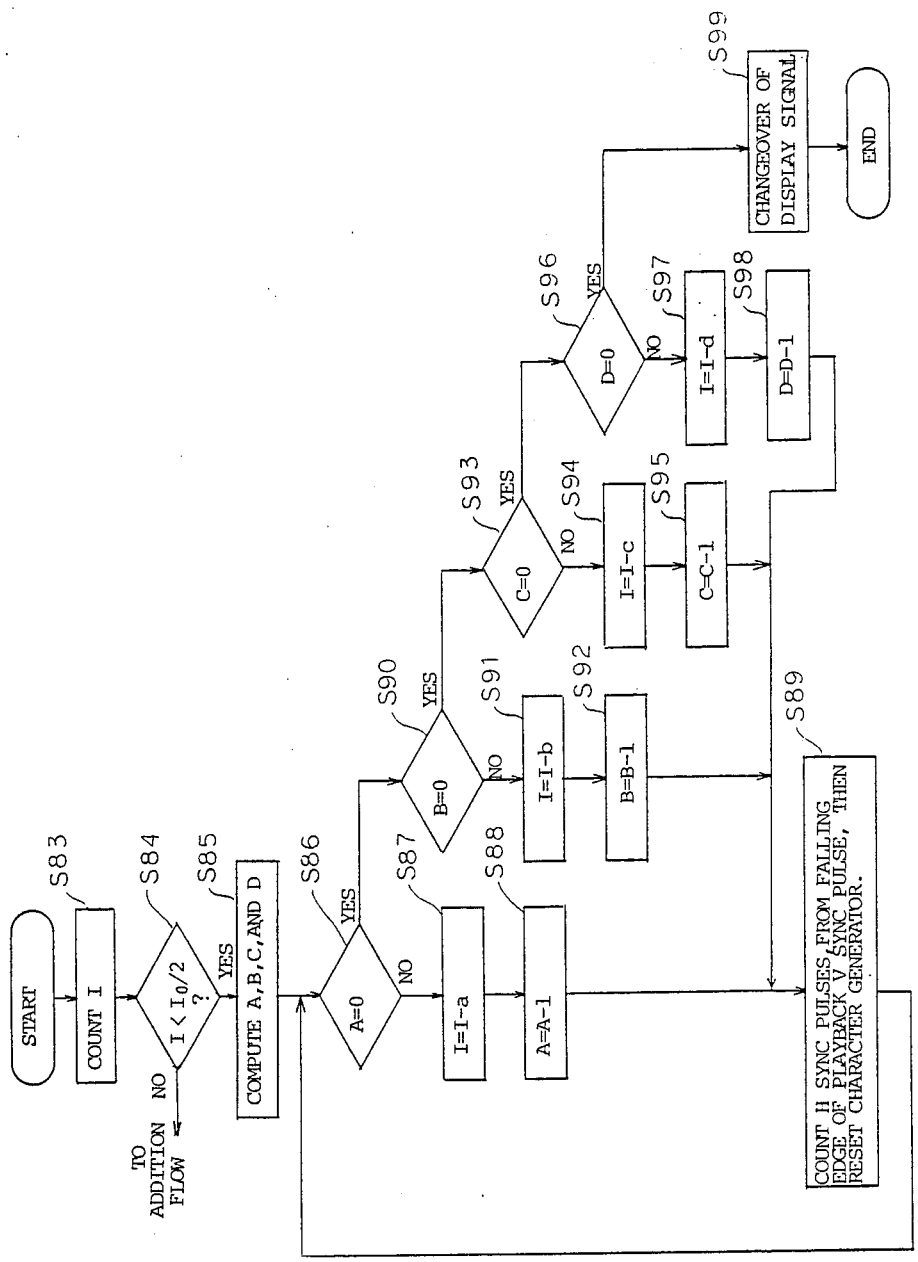
FIG. 21 is a flow chart of an operating sequence which is executed to bring the vertical sync signal of a playback video signal and the vertical sync signal of a blue picture signal into a phase-synchronized relationship.

In FIGS. 20 and 21, I denotes a number of horizontal sync pulses which occur during an interval between a falling edge of a playback video vertical sync pulse and the next falling edge of a blue video vertical sync pulse. $I_o$ denotes a number of horizontal sync pulses which occur during an interval between the falling edges of two successive playback video vertical sync pulses. In this embodiment, phase synchronization is achieved by adding or subtracting specific numbers of horizontal sync pulses to or from the blue video vertical sync signal, in four stages. a, b, c and d respectively denote numbers of horizontal sync pulses which are added or subtracted, while A, B, C and D denote numbers of times that an operation of adding (or subratcting) a, b, c and d pulses respectively is repeated. The numbers of pulses a, b, c and d, and the numbers of repetitions A, B, C and D are respectively predetermined and are stored in a memory of the microcomputer of operating section 48.

In FIG. 21, firstly, the number of horizontal sync pulses which occur between a falling edge of a playback video vertical sync pulse and the next falling edge of a blue video vertical sync pulse is counted (step 83), then the processor judges whether or not $I<I_o/2$, i.e. judges whether the time interval between a falling edge of a playback video vertical sync pulse and the next falling edge of a blue video vertical sync pulse is greater than ½ of the interval between two successive falling edges of the playback video vertical sync signal (step 84). If it is judged that the former time interval is greater than ½ of the latter time interval, then a number of horizontal sync pulses must be subtracted from the blue video vertical sync signal, and computation of the necessary values for A through D is performed, based on the value of I (step 85). Step 86 is then executed (with a "no" decision) and a pulses are subtracted (step 87). In addition, the value of A is reduced by one (step 88). Next, the number of horizontal sync pulses which occur between successive falling edges of the playback video vertical sync signal is counted, and the character generator 27f is reset at the timing of the I'th of these pulses (step 89). The operations described above are then successively repeated, until the decision "A=0" is made in step 86.

If "A=0" is judged in step 86, then step 90 is executed, and b horizontal sync pulses are then subtracted (step 91), while in addition the number of repetitions set as the value B is reduced by one (step 92). Execution then returns to step 89, and the operations described above are repeated until a decision "B=0" is made in step 90. Thus, after B repetitions, step 93 is executed, and c horizontal sync pulses are subtracted (step 94), while in addition the value of C is reduced by one (step 95). Step 89 is then again executed, and the above operations are repeated until a decision "B=0" is made in step 90. Thus, after C repetitions, step 96 is executed, and d horizontal sync pulses are subtracted (step 97), and the value of D is then reduced by one (step 98). Execution then returns to step 89, and the operations described above are repeated until a decision "D=0" is made in step 96. When this occurs, the process of pulling the blue picture vertical sync signal into phase synchronization with the playback video vertical sync signal has been completed, and display signal changeover is then carried out, as described above (step 99).

If it is judged in step 84 that $I \geq I_o/2$, then horizontal sync pulses must be added to the blue picture vertical sync signal. The operating flow to perform this can be the same as that of FIG. 21 (i.e. steps 85 through 96), but with a pulse addition operation being executed in each of steps 87, 91, 94 and 97, instead of a subtraction.

When numbers of pulses are added or subtracted in stages, as with this embodiment, it is preferable that the number of pulses which is added or subtracted is gradually increased and gradually decreased. Furthermore, the maximum number of horizontal sync pulses which is added or subtracted at one time must be held within a limit which will not result in a disordered picture, e.g. approximately 10 pulses.

During the process of bringing the blue picture vertical sync signal into phase synchronization with the playback video vertical sync signal, an interchange of various signals occurs between the system controller 47 and video data demodulation system 27, via the bus 45. These signals include the playback video vertical sync signal, the playback video horizontal sync signal, the blue picture vertical sync signal, and reset signals from the character generator 27f, etc.

In the above embodiment, detection of the condition in which the light spot of pickup 3 has reached the video area is performed on the basis of a detection signal produced from position detector 46. However it would be equally possible to detect when the light spot reaches the video area by utilizing for example the circuit shown in FIG. 22, whereby the video carrier is separated from the playback RF signal by means of a band-pass filter 60, and the peak amplitude of the video carrier is held in a peak holding circuit 61, to be compared with a reference level by a comparator 62. In this case the passband of filter 60 should be of the form indicated by the chain-line outline in FIG. 23, in order to pass the luminance signal component C of the FM modulated video signal. In FIG. 23, A denotes the PCM audio signal.

With a data recording disc playback apparatus according to the present invention, as described hereinabove, changeover of the equalization characteristic and gain of a digital signal processing system is performed during playback of a composite disc in accordance with whether playback of the CD area or of the video area the disc is being executed. In this way, a playback digital signal is obtained whose frequency characteristic and amplitude are identical both for the case of playback of the CD area and playback of the video area, and a single demodulation system can be used in common for digital playback signals produced during both playback of the CD area and of the video area, thereby enabling the manufacturing cost of the apparatus to be lowered.

Furthermore, with a data recording disc playback apparatus according to the present invention, changeover of the equalization characteristic and loop gain of at least one of the servo systems of the apparatus is performed during playback of a composite disc, in accordance with playback of the video area and playback of the CD area respectively, whereby an error signal having an identical frequency characteristic and amplitude is supplied to that servo system during both CD area and video area playback. In this way, stable servo contro is attained, irrespective of differences in the speed of disc rotation between playback of these areas, so that accurate and reliable reading of recorded data can be carried out.

With a data recording disc playback apparatus according to the present invention as described above, a spindle servo circuit is used to control a spindle motor, to thereby control the velocity of displacement of a data sensing light spot with respect to a disc. However the scope of the invention also covers the application of such control to a tangential servo circuit which controls a tangential mirror or a tangential actuator.

Furthermore, with a data recording disc playback apparatus according to the present invention, when a track jump operation is executed during playback of a composite disc, changeover of at least one of the peak amplitude and pulse width of drive pulses applied to a tracking actuator and to a carriage motor is executed, in accordance with playback of the video area and the CD area of the disc, respectively. In this way, although the speed of rotation of the disc differs substantially for playback of these respective areas, a satisfactory degree of track jump control is attained during playback of both the video area and the CD area.

With a data playback method according to the present invention, detection of the video area of a composite disc is performed by utilizing a position detector. After the data sensing light spot position has been detected by using this position detector, reading of recorded data is executed, and the position of the light spot is then controlled such as to move to a position within the video lead-in area, with the latter control being executed on the basis of the data which has been read from the disc. In this way, playback is made to reliably begin from the lead-in area, so that the adverse effects of detection errors generated by the position detector, dimensional variations etc. between different discs, or position overshoot by the carriage, are substantially suppressed.

Moreover with a data recording disc playback apparatus according to the present invention, when a composite disc having a color television standard which does not conform to that of the playback apparatus is set into the apparatus, spindle servo control is executed on the basis of a phase difference between the playback clock signal contained in a playback digital signal and a reference clock signal, during video area playback, with the playback video signal being muted and only the digital signal component of the video area being produced as output. In this way, even if the composite disc standard is different from that of the apparatus, playback of at least audio data from the video area can be achieved, thereby enhancing the value of such an apparatus to the user. Furthermore during playback in such a condition, an indication is provided to the user that the television standard of the disc does not conform to that of the playback apparatus, so that the user is notified of the reason why video playback is not possible.

Furthermore, during disc playback with a data playback method according to the present invention, if it is judged that the disc being played is a composite disc, and if video area playback is designated, then the speed of rotation of the disc is accelerated towards the maximum speed of disc rotation, while in addition the data sensing light spot of the pickup is moved towards the video area. In this way, playback can immediately begin when the light spot reaches the video area, in spite of the fact that a considerable change in the speed of rotation of the disc must be performed in order to change to video area playback operation.

With a data recording disc playback apparatus according to the present invention, although the disc speeds of rotation for playback of the CD area and the video area respectively are extremely different, accurate rotational speed control is achieved for both of these regions, and both video data and digital data can be simultaneously read from the video area. Furthermore, irrespective of the area from which playback is being executed, disc rotational speed control is performed on the basis of a playback clock signal which is obtained from the playback digital signal, so that even if the color television standard of the video data is different from that of the playback apparatus, playback of audio data is reliably achieved, since the CD format is common to all discs. In addition, playback of video data in black and white will be possible.

What is claimed is:

1. A data reading apparatus capable of reading a data recording disc with predetermined data which has been subjected to digital modulation processing recorded in a first area of said disc and a video signal which has been subjected to frequency modulation processing recorded with a predetermined digital signal superimposed thereon in a second area of said disc disposed peripherally outward from said first area, the apparatus comprising:

a pickup for directing a light beam onto a recording surface of said data recording disc for detecting recorded data of said disc by means of light reflected from said recording surface;

focus servo means for controlling a position of a focal point of said light beam, to form a data detection point of said pickup on said recording surface;

tracking servo means for controlling the position of said data detection point along a radial direction of said disc;

carriage servo means for controlling a relative position of a carriage which supports said pickup, along a radial direction of said disc;

spindle servo means for controlling a relative velocity of displacement of said data detection point with respect to said disc and;

means for detecting when said data detection point has reached positions adjacent to respective boundaries of said first and second areas, and for producing a corresponding detection signal;

wherein the improvement comprises:

means for executing changeover of the gain of a servo amplifier of at least one of said tracking servo means, said carriage servo means, and said spindle servo means, in accordance with indications of said first area and said second area respectively by said detection signal.

2. A data recording disc playback apparatus capable of playback of a data recording disc with predetermined data which has been subjected to digital modulation processing recorded in a first area of said disc and a video signal which has been subjected to frequency modulation processing recorded with a predetermined digital signal superimposed thereon in a second area of said disc disposed peripherally outward from said first area, the apparatus comprising:

an equalizer circuit for performing compensation of a frequency characteristic of a playback digital signal, and;

means for detecting when a data detection point of a pickup of said apparatus reaches positions adjacent to respective boundaries of said first and second areas, and for producing a corresponding detection signal;

wherein the improvement comprises:

means for executing changeover of an equalizing chaacteristic of said equalizer circuit in accordance with indication of said first and second areas respectively by said detection signal.

3. A data recording disc playback apparatus capable of playback of a data recording disc with predetermined data which has been subjected to digital modulation processing recorded in a first area of said disc and a video signal which has been subjected to frequency modulation processing recorded with a predetermined digital signal superimposed thereon in a second area of said disc disposed peripherally outward from said first area, the apparatus comprising:

an equalizer circuit for performing compensation of a frequency characteristic of a playback digital signal;

an amplitude control circuit for controlling an amplitude of an said playback digital signal;

means for detecting when said data detection point has reached positions adjacent to respective boundaries of said first and second areas, and for producing a corresponding detection signal;

wherein the improvement comprises:

means for executing changeover of an equalizing characteristic of said equalizer circuit and of a degree of control applied by said amplitude control circuit, respectively, in accordance with indication of said first and second areas respectively by said detection signal.

4. A data recording disc playback apparatus capable of playback of a data recording disc with predetermined data which has been subjected to digital modulation processing recorded in a first area of said disc and a video signal which has been subjected to frequency modulation processing recorded with a predetermined digital signal superimposed thereon in a second area of said disc disposed peripherally outward from said first area, the apparatus comprising:

a pickup for directing a light beam onto a recording surface of said data recording disc for detecting recorded data of said disc by means of light reflected from said recording surface;

focus servo means for controlling a position of a focal point of said light beam, to forma data detection ponit of said pickup on said recording surface;

tracking servo means for controlling the position of said data detection point along a radial direction of said disc;

carriage servo means for controlling the position of a carriage which supports said pickup, along a radial direction of said disc;

spindle servo means for controlling a relative velocity of displacement of said data detection point with respect to said disc and;

means for detecting when said data detection point has reached positions adjacent to respective boundaries of said first and second areas, and for producing a corresponding detection signal;

wherein the improvement comprises:

means for executing changeover of an equalizing characteristic of an equalizer circuit of at least one of said tracking servo means, said carriage servo means, and said spindle servo means, in accordance with indications of said first area and said second area respectively by said detection signal.

5. A data recording disc playback apparatus capable of playback of a data recording disc with predetermined data which has been subjected to digital modulation processing recorded in a first area of said disc and a video signal which has been subjected to frequency modulation processing recorded with a predetermined digital signal superimposed thereon in a second area of said disc disposed peripherally outward from said first area, the apparatus comprising:

a pickup for directing a light beam onto a recording surface of said data recording disc for detecting recorded data of said disc by means of light reflected from said recording surface;

focus servo means for controlling a position of a focal point of said light beam, to form a data detection point of said pickup on said recording surface;

tracking servo means for controlling the position of said data detectio point along a radial direction of said disc;

carriage servo means for controlling a position of a carriage which supports said pickup, along a radial direction of said disc;

spindle servo means for controlling a relative velocity of displacement of said data detection point with respect to said disc and;

means for detecting when said data detection point has reached positions adjacent to respective boundaries of said first and second areas, and for producing a corresponding detecting signal;

wherein the improvement comprises:

means for executing changeover of an equalizing characteristic of an equalizer circuit and the gain of a servo amplifier, respectively, of at least one of said tracking servo means, said carriage servo means, and said spindle servo means, in accordance with indications of said first area and said second area respectively by said detection signal.

6. A data recording disc playback apparatus capable of playback of a data recording disc with predetermined data which has been subjected to digital modulation processing recorded in a first area of said disc and a video signal which has been subjected to frequency modulation processing recorded with a predetermined digital signal superimposed thereon in a second area of said disc disposed peripherally outward from said first area, the apparatus comprising:

a pickup for directing a light beam onto a recording surface of said data recording disc for detecting recorded data of said disc by means of light reflected from said recording surface;

first means for biasing a data detection point of said pickup along a radial direction of said disc;

second means for moving said pickup along a radial direction of said disc;

means for applying drive pulses to said first means and second means in response to a track jump command and;

means for detecting when said data detection point has reached positions adjacent to respective boundaries of said first and second areas, and for producing a corresponding detection signal;

wherein the improvement comprises:

means for changeover of at least one of the pulse width and the amplitude of said drive pulses, in accordance with indication by said detection signal of said first area and second area respectively.

7. A data playback method for a data recording disc playback apparatus capable of playback of a data recording disc with predetermined data which has been subjected to digital modulation processing recorded in a first area of said disc and a video signal which has been subjected to frequency modulation processing recorded with a predetermined digital signal superimposed thereon in a second area of said disc disposed peripherally outward from said first area, wherein the improvement comprises:

initiating reading of recorded data by a pickup of said apparatus when it is detected that a data detection point of said pickup has reached said second area, and;

if it is not found possible to read predetermined data at the position thus reached, causing said data detection point to jump over a predetermined number of tracks of said disc in a direction towards said first area, and restarting reading of data from said disc.

8. A data playback method according to claim 7, and further whereby if it is not found possible to read predetermined data after said restarting of reading of data following said track jump, said data detection point is caused to jump over a predetermined number of tracks whereupon data reading is again initiated, with said jumping and reading operatios being repetitively executed thereafter until it is found possible to reach said predetermined data.

9. A data playback method according to claim 7, and further whereby when program data are read from said second area at said detection position, a specific number of tracks is computed based upon said data, and said data detection point is then displaced by said computed number of tracks.

10. A data recording disc playback apparatus capable of playback of a data recording disc with predetermined data which has been subjected to digital modulation processing recorded in a first area of said disc and a video signal which has been subjected to frequency modulation processing recorded with a predetermined digital signal superimposed thereon in a second area of said disc disposed peripherally outward from said first area, said disc further having television standard data expressing a color television standard recorded in a lead-in area thereof, the apparatus comprising means for controlling the speed of rotation of said disc in accordance with a phase difference between a playback clock signal contained in a playback digital signal and a reference clock signal;
wherein the improvement comprises:
means for judging the television standard of said disc, based on said television standard data, and for producing a non-correspondence signal in the event that said television standards of said disc and said apparatus are respectively different, and;
means responsive to said non-correspondence signal for inhibiting a playback television signal from being produced as an output of said apparatus.

11. A data recording disc playback apparatus capable of playback of a data recording disc with predetermined data which has been subjected to digital modulation processing recorded in a first area of said disc and a video signal which has been subjected to frequency modulation processing recorded with a predetermined digital signal superimposed thereon in a second area of said disc disposed peripherally outward from said first area, said disc further having television standard data expressing a color television standard recorded in a lead-in area thereof, the apparatus comprising means for controlling the speed of rotation of said disc in accordance with a phase difference between a playback clock signal contained in a playback digital signal and a reference clock signal;
wherein the improvement comprises:
means for judging the television standard of said disc, based on said television standard data, and for producing a non-correspondence signal in the event that said television standards of said disc and said apparatus are respectively different;
means responsive to said non-correspondence signal for inhibiting a playback television signal from being produced as an output of said apparatus, and;
means responsive to said non-correspondence siganl for producing an indication that the television standard of a disc being played by said apparatus and the television standard said apparatus are respectively different.

12. A data playback method for a playback apparatus capable of playback of a first type of disc, having predetermined data which has been subjected to digital modulation processing recorded in a first area of said disc and a video signal which has been subjected to frequency modulation processing recorded with a predetermined digital signal superimposed thereon in a second area of said disc disposed peripherally outward from said first area, and a second type of disc having recorded throughout the entirety of a recording area thereof predetermined data which has been subjected to digital modulation processing and recorded as a pulse train, wherein the improvement comprises:
reading disc indentifier data recorded in a lead-in area of a disc which is being played by said apparatus, judging whether said disc is of said first type on the basis of said disc indentifier data, and whether playback of data from said second area is designated, and if said disc is found to be of said first type with playback of said second area designated, immediately accelerating said disc towards a specified maximum speed of rotation for playback and moving a data detection point of a pickup of said apparatus towards said second area.

13. A data recording disc playback apparatus capable of playback of a data recording disc with predetermined data which has been subjected to digital modulation processing recorded in a first area of said disc and a video signal which has been subjected to frequency modulation processing recorded with a predetermined digital signal superimposed thereon in a second area of said disc disposed peripherally outward from said first area;
wherein the improvement comprises:
means for generating an error signal in accordance with a phase difference between a playback clock signal contained in a playback digital signal and a refernece clock signal and;
means for controlling the speed of rotation of said disc in accordance with said error signal, irrespective of whether data are being read from said first area or said second area.

14. A data recording disc playback apparatus capable of playback of a data recording disc with predetermined data which has been subjected to digital modulation processing recorded in a first area of said disc and a video signal which has been subjected to frequency modulation processing recorded with a predetermined digital signal superimposed thereon in a second area of said disc disposed peripherally outward from said first area;
wherein the improvement comprises:
means for generating a first error signal in accordance with a phase difference between a playback clock signal contained in a playback digital signal and a reference clock signal;
means for generaing a second error signal in accordance with a phase difference between a clock signal contained in a playback video signal and a reference clock signal, and;
means for controlling the speed of rotation of said disc in accordance with said first error signal during playback of said first area and for controlling said speed of rotation in accordance with said second error signal during playback of said second area.

* * * * *